US012609794B2

(12) United States Patent
Kumar et al.

(10) Patent No.: US 12,609,794 B2
(45) Date of Patent: *Apr. 21, 2026

(54) DYNAMIC ADDITIONAL DEMODULATION REFERENCE SIGNAL CONFIGURATION

(71) Applicant: Dell Products L.P., Round Rock, TX (US)

(72) Inventors: Sunil Kumar, Bangalore (IN); Mudit Gupta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 449 days.

This patent is subject to a terminal disclaimer.

(21) Appl. No.: 17/812,265

(22) Filed: Jul. 13, 2022

(65) Prior Publication Data

US 2024/0022373 A1     Jan. 18, 2024

(51) Int. Cl.
*H04L 5/00* (2006.01)
*H04W 76/10* (2018.01)

(52) U.S. Cl.
CPC ........... *H04L 5/0051* (2013.01); *H04W 76/10* (2018.02)

(58) Field of Classification Search
CPC ............................. H04W 76/10; H04L 5/0051
USPC ........................................................ 370/329
See application file for complete search history.

(56) References Cited

U.S. PATENT DOCUMENTS 11,336,419 B2     5/2022   Wang et al.
12,323,356 B2 *   6/2025   Kumar .................. H04L 5/0098

2015/0304080 A1   10/2015   Yi et al.
2016/0127932 A1 *  5/2016   Cosimini .............. H04W 80/06
                                                  370/252
2016/0212737 A1    7/2016   Jang et al.
2018/0270103 A1    9/2018   Chapman et al.
2019/0223176 A1    7/2019   Liu et al.
(Continued)

FOREIGN PATENT DOCUMENTS

WO        2018229955        12/2018
WO        2019/032296        2/2019
(Continued)

OTHER PUBLICATIONS

International Search Report and Written Opinion mailed Apr. 19, 2024 for PCT Application No. PCT/US2023/035945, 17 pages.
(Continued)

*Primary Examiner* — Christopher R Crompton
(74) *Attorney, Agent, or Firm* — Amin, Turocy & Watson, LLP

(57)        ABSTRACT

A system can configure a first number of demodulation reference signal positions in radio resource control information as part of a connection setup with a base station that is configured to facilitate first broadband cellular communications. The system can, after attaching to the base station, receive a message from the base station indicative of modifying the first number of demodulation reference signal positions to a second number of demodulation reference signal positions. The system can conduct second broadband cellular communications with the base station according to the second number of demodulation reference signal positions, wherein a throughput of the second broadband cellular communications is determined as a function of a size of a transport block set based on the second number of demodulation reference signal positions.

20 Claims, 19 Drawing Sheets

1100

(56) References Cited

U.S. PATENT DOCUMENTS

| | | | |
|---|---|---|---|
| 2019/0349023 | A1 | 11/2019 | Ge et al. |
| 2020/0052802 | A1 | 2/2020 | Ryu et al. |
| 2020/0229185 | A1 | 7/2020 | Zhang et al. |
| 2020/0314960 | A1 | 10/2020 | Basu Mallick et al. |
| 2020/0328861 | A1 | 10/2020 | Malladi et al. |
| 2021/0075571 | A1 | 3/2021 | Manolakos et al. |
| 2021/0153171 | A1 | 5/2021 | Saito et al. |
| 2021/0250753 | A1 | 8/2021 | Hosseini et al. |
| 2022/0078872 | A1 | 3/2022 | Shrestha et al. |
| 2022/0123853 | A1 | 4/2022 | Chandran et al. |
| 2022/0159757 | A1 | 5/2022 | Balasubramanian et al. |
| 2022/0166566 | A1 | 5/2022 | Kumar et al. |
| 2022/0286253 | A1 | 9/2022 | Chae et al. |
| 2023/0006762 | A1 | 1/2023 | Levitsky et al. |
| 2023/0139332 | A1 | 5/2023 | Dinan |
| 2023/0164702 | A1 | 5/2023 | Lee et al. |
| 2023/0216711 | A1 | 7/2023 | Yao et al. |
| 2023/0353306 | A1 | 11/2023 | Ren et al. |
| 2023/0371030 | A1 | 11/2023 | Wang et al. |
| 2023/0379926 | A1 | 11/2023 | Pardhasarathy et al. |
| 2023/0379927 | A1 | 11/2023 | Agarwal et al. |
| 2023/0379930 | A1 | 11/2023 | Chacko et al. |
| 2024/0187182 | A1 | 6/2024 | Shukla |

FOREIGN PATENT DOCUMENTS

| | | |
|---|---|---|
| WO | 2021/243481 | 12/2021 |
| WO | 2022/031919 | 2/2022 |
| WO | 2023/048330 | 3/2023 |

OTHER PUBLICATIONS

Moderator (Huawei): "Summary#I of efficient SCell activation/deactivation mechanism of NR CA", 3GPP Draft; R1-2103886, RAN WG1, No. E-meeting; Apr. 20, 2021, [https://ftp.3gpp.org/tsg_ran/WG1_RL1/TSGR1_104b-e/Inbox/R1-2103886.zip RI-2103886 Sumniary#2 of SCell activation of NR CA.docx], 43 pages.

International Search Report and Written Opinion mailed Feb. 13, 2024 for PCT Application No. PCT/US2023/035946, 14 pages.

International Search Report and Written Opinion mailed Feb. 26, 2024 for PCT Application No. PCT/US2023/035950, 19 pages.

International Search Report and Written Opinion mailed Mar. 1, 2024 for PCT Application No. PCT/US2023/036165, 19 pages.

Kumar et al. "Dynamic Additional Demodulation Reference Signal Configuration" U.S. Appl. No. 17/812,261, filed Jul. 13, 2022, 64 pages.

Kumar et al. "Dynamic Additional Demodulation Reference Signal Configuration" U.S. Appl. No. 17/812,271, filed Jul. 13, 2022, 62 pages.

Kumar et al. "Dynamic Additional Demodulation Reference Signal Configuration" U.S. Appl. No. 17/812,262, filed Jul. 13, 2022, 62 pages.

Kumar, Sunil. "Dynamic Additional Demodulation Reference Signal Configuration" U.S. Appl. No. 18/063,347, filed Dec. 8, 2022, 74 pages.

Kumar, Sunil. "Dynamic Additional Demodulation Reference Signal Configuration" U.S. Appl. No. 18/063,357, filed Dec. 8, 2022, 73 pages.

Kumar, Sunil. "Dynamic Additional Demodulation Reference Signal Configuration" U.S. Appl. No. 18/068,261, filed Dec. 19, 2022, 69 pages.

Kumar, Sunil. "Dynamic Additional Demodulation Reference Signal Configuration" U.S. Appl. No. 18/068,737, filed Dec. 20, 2022, 68 pages.

Notification concerning transmittal of International Preliminary Report on Patentability mailed Jun. 19, 2025 for PCT Application No. PCT/US2023/035945, 10 pages.

European Office Action mailed Jul. 15, 2025 for European Patent Application No. 23813121.3, 3 pages.

Notification concerning transmittal of International Preliminary Report on Patentability mailed Jun. 19, 2025 for PCT Application No. PCT/US2023/035946, 9 pages.

European Office Action mailed Jul. 15, 2025 for European Patent Application No. 2309824.8, 3 pages.

Office Action mailed Jul. 9, 2025 for U.S. Appl. No. 18/068,261, 47 pages.

Notification concerning transmittal of International Preliminary Report on Patentability mailed Jul. 3, 2025 for PCT Application No. PCT/US2023/035950, 14 pages.

Notification concerning transmittal of International Preliminary Report on Patentability mailed Jul. 3, 2025 for PCT Application No. PCT/US2023/036165, 14 pages.

European Office Action mailed Jul. 29, 2025 for European Patent Application No. 23813122.1, 3 pages.

European Office Action mailed Jul. 29, 2025 for European Patent Application No. 23813147.8, 3 pages.

Notice of Allowance mailed Jul. 29, 2025 for U.S. Appl. No. 18/063,347, 24 pages.

Notice of Allowance mailed May 13, 2025 for U.S. Appl. No. 17/812,261, 34 pages.

Office Action mailed Nov. 19, 2024 for U.S. Appl. No. 17/812,262, 44 pages.

Final Office Action mailed Feb. 18, 2025 for U.S. Appl. No. 17/812,261, 50 pages.

Notice of Allowance mailed May 5, 2025 for U.S. Appl. No. 18/068,737, 40 pages.

Office Action mailed Mar. 24, 2025 for U.S. Appl. No. 18/063,347, 43 pages.

Office Action mailed Apr. 3, 2025 for U.S. Appl. No. 18/063,357, 66 pages.

Notice of Allowance mailed Feb. 26, 2025 for U.S. Appl. No. 17/812,262, 22 pages.

Office Action mailed Apr. 10, 2025 for U.S. Appl. No. 17/812,271, 35 pages.

Notice of Allowance mailed Aug. 19, 2025 for U.S. Appl. No. 17/812,271, 37 pages.

Office Action mailed Oct. 28, 2025 for U.S. Appl. No. 18/063,357, 82 pages.

Office Action mailed Aug. 15, 2024 for U.S. Appl. No. 17/812,261, 53 pages.

Office Action mailed Jan. 27, 2026 for U.S. Appl. No. 18/068,261, 49 pages.

Notice of Allowance mailed Feb. 10, 2026 for U.S. Appl. No. 18/063,357, 24 pages.

* cited by examiner

<u>100</u>

```
--- ASN1START
--- TAG-DMRS-DOWNLINKCONFIG-START

DMRS-DownlinkConfig ::=              SEQUENCE {
    dmrs-Type                         ENUMERATED {type2}                        OPTIONAL,    -- Need S
    dmrs-AdditionalPosition           ENUMERATED {pos0, pos1, pos3}            OPTIONAL,    -- Need S
    maxLength                         ENUMERATED {len2}                         OPTIONAL,    -- Need S
    scramblingID0                     INTEGER (0..65535)                        OPTIONAL,    -- Need S
    scramblingID1                     INTEGER (0..65535)                        OPTIONAL,    -- Need S
    phaseTrackingRS                   SetupRelease { PTRS-DownlinkConfig }      OPTIONAL,    -- Need M ...,
    [[
    dmrs-Downlink-r16                 ENUMERATED {enabled}                      OPTIONAL     -- Need R
    ]]

}

--- TAG-DMRS-DOWNLINKCONFIG-STOP
--- ASN1STOP
```

```
--- ASN1START
--- TAG-DMRS-UPLINKCONFIG-START

DMRS-UplinkConfig ::=                   SEQUENCE {
    dmrs-Type                               ENUMERATED {type2}          OPTIONAL,    --- Need S
    dmrs-AdditionalPosition                 ENUMERATED {pos0, pos1, pos3}  OPTIONAL,  --- Need S
    phaseTrackingRS                         SetupRelease { PTRS-UplinkConfig }  OPTIONAL,  --- Need M
    maxLength                               ENUMERATED {len2}           OPTIONAL,    --- Need S
    transformPrecodingDisabled              SEQUENCE {
        scramblingID0                           INTEGER (0..65535)       OPTIONAL,    --- Need S
        scramblingID1                           INTEGER (0..65535)       OPTIONAL,    --- Need S
        ...,
        [[
        dmrs-Uplink-r16                         ENUMERATED {enabled}     OPTIONAL     --- Need R
        ]]
    }                                                                    OPTIONAL,    --- Need R

--- TAG-DMRS-UPINKCONFIG-STOP
--- ASN1STOP
```

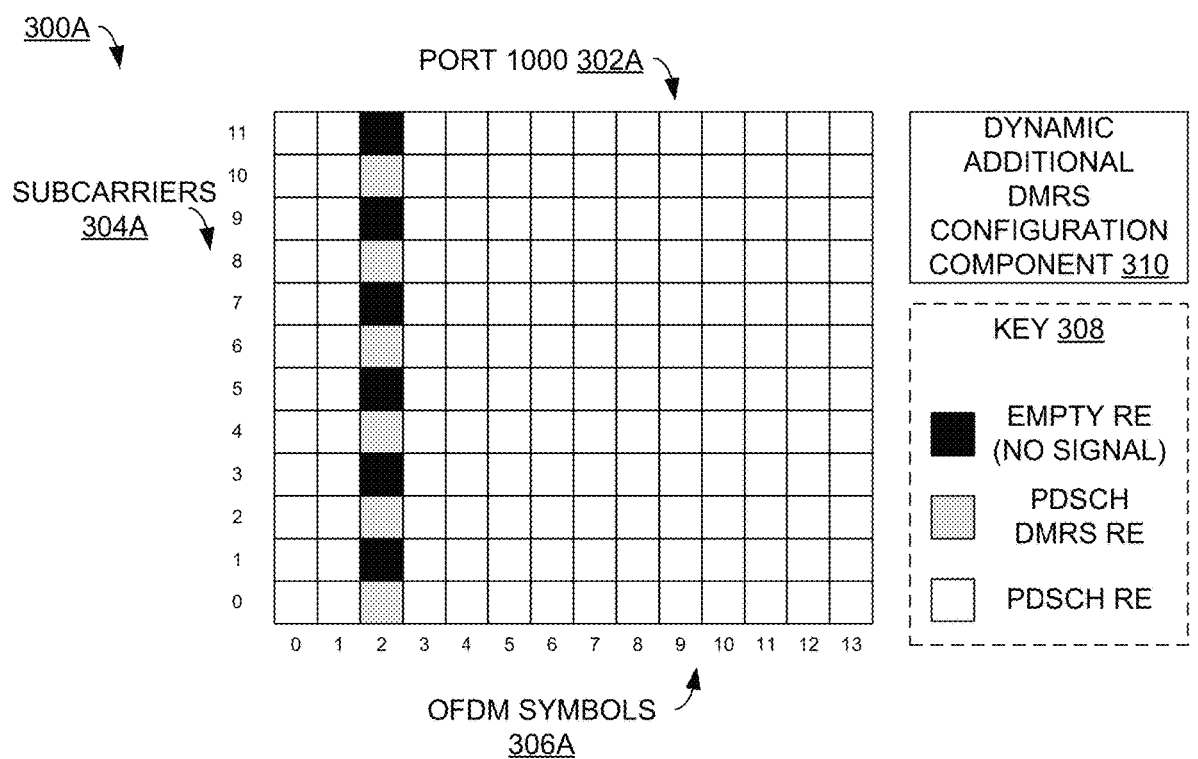
PORT 1000 302A
SUBCARRIERS 304A
OFDM SYMBOLS 306A
DYNAMIC ADDITIONAL DMRS CONFIGURATION COMPONENT 310
KEY 308
■ EMPTY RE (NO SIGNAL)
▨ PDSCH DMRS RE
□ PDSCH RE
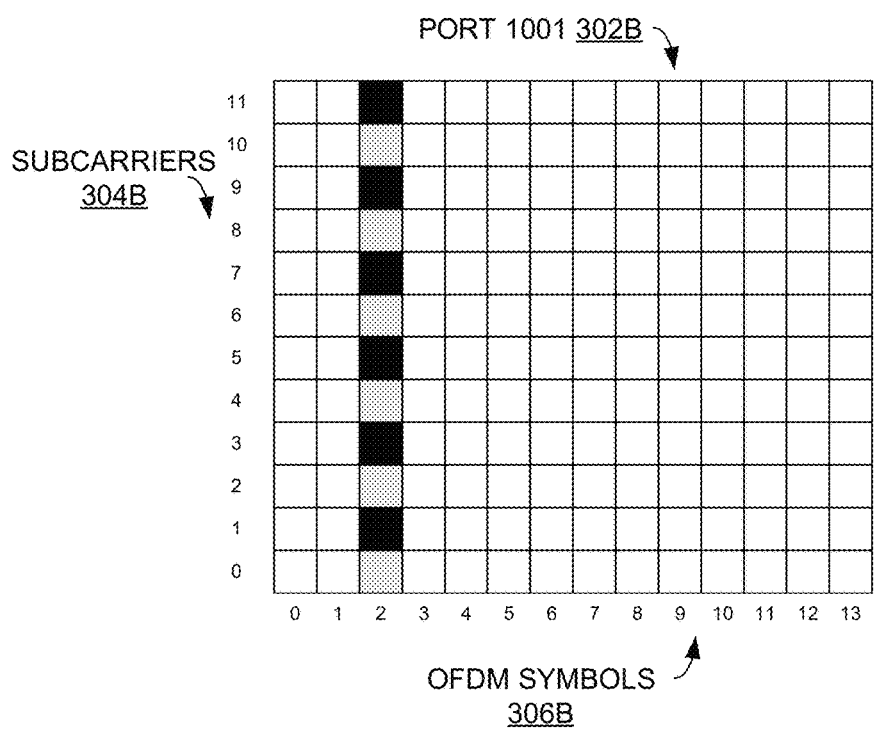
PORT 1001 302B
SUBCARRIERS 304B
OFDM SYMBOLS 306B
FIG. 3A

300B
PORT 1002 302C
SUBCARRIERS
304C
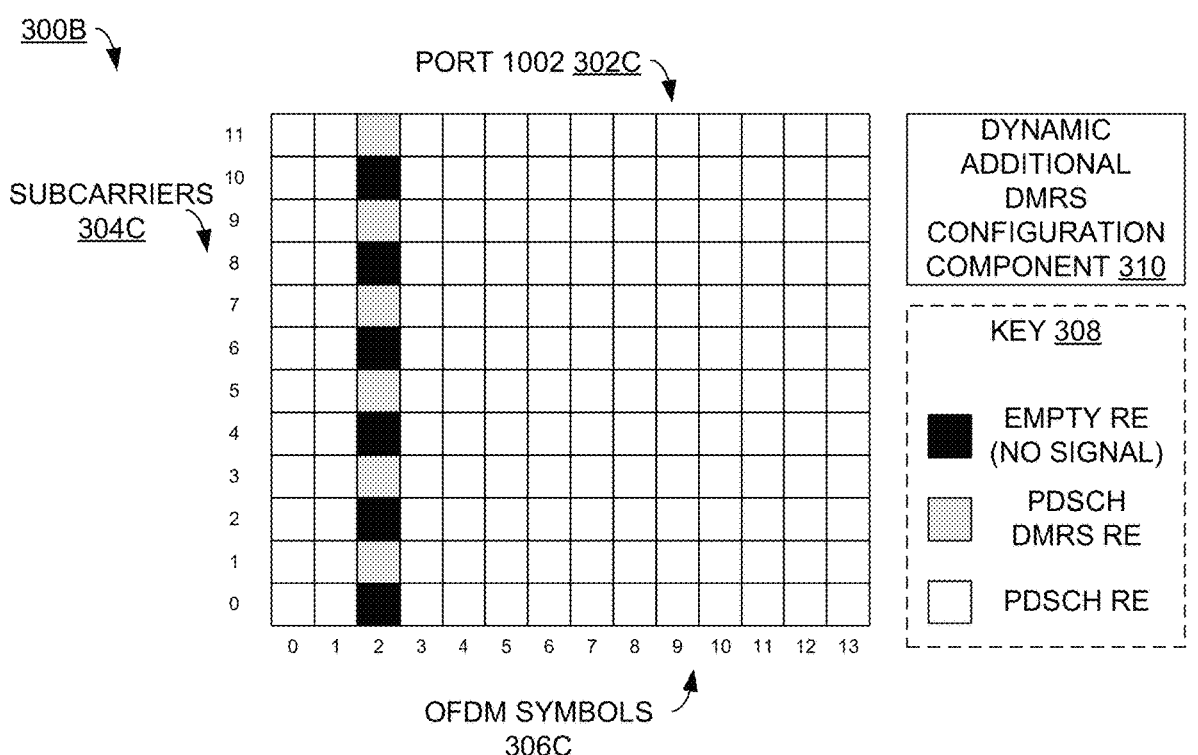
OFDM SYMBOLS
306C
DYNAMIC
ADDITIONAL
DMRS
CONFIGURATION
COMPONENT 310
KEY 308
■ EMPTY RE
(NO SIGNAL)
▨ PDSCH
DMRS RE
□ PDSCH RE
PORT 1003 302D
SUBCARRIERS
304D
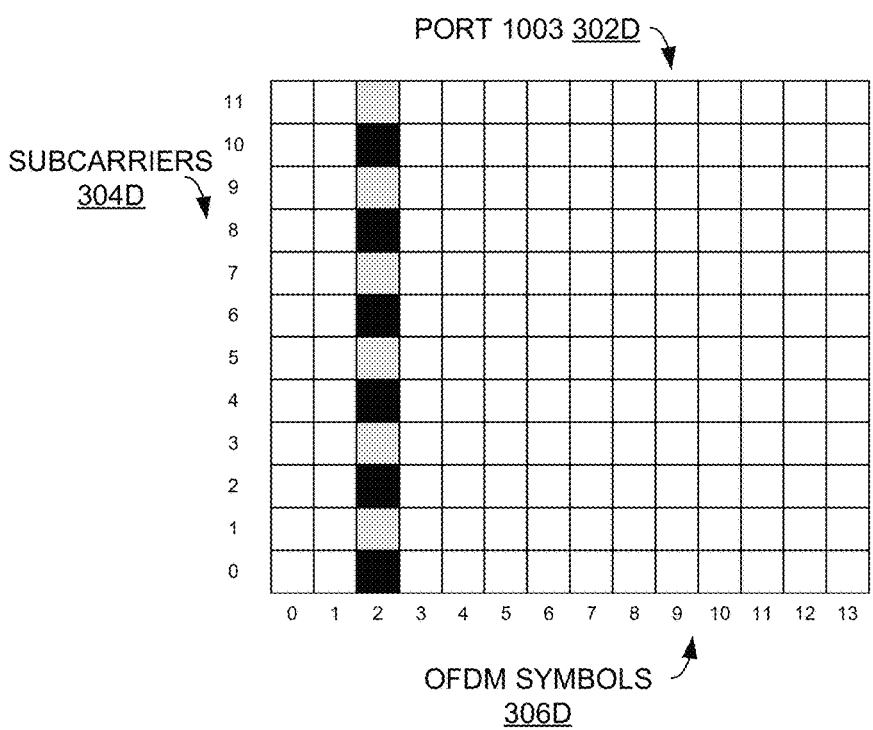
OFDM SYMBOLS
306D
FIG. 3B

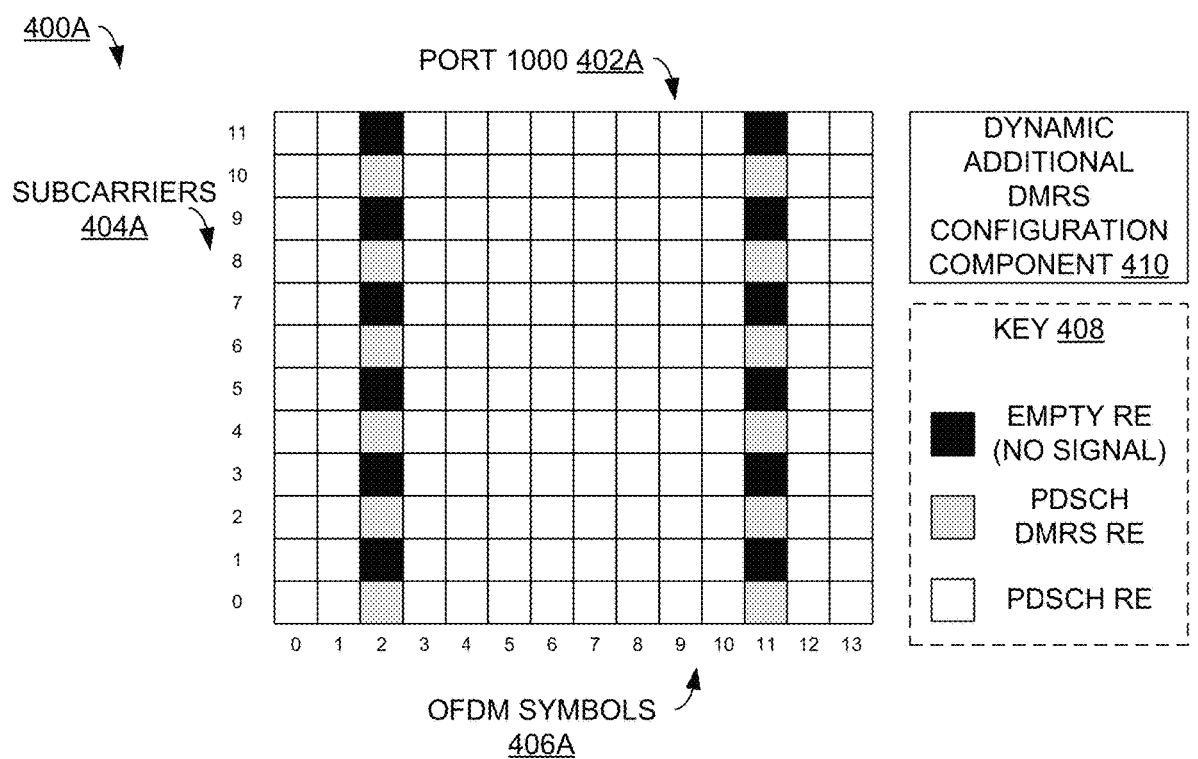
PORT 1000 402A
SUBCARRIERS
404A
OFDM SYMBOLS
406A
DYNAMIC
ADDITIONAL
DMRS
CONFIGURATION
COMPONENT 410
KEY 408
■ EMPTY RE
(NO SIGNAL)
▨ PDSCH
DMRS RE
□ PDSCH RE
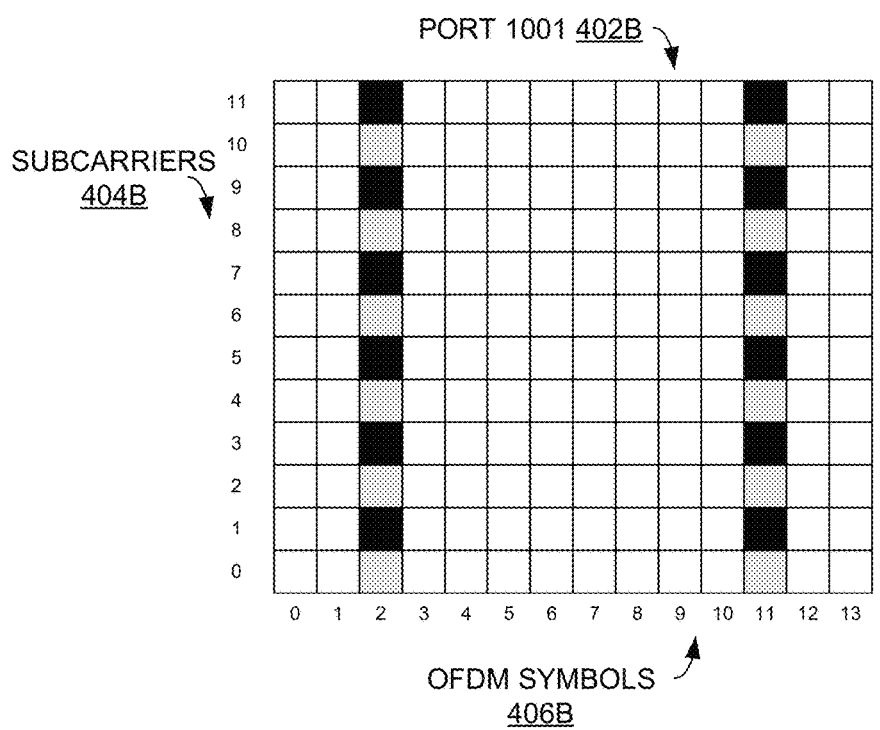
PORT 1001 402B
SUBCARRIERS
404B
OFDM SYMBOLS
406B
FIG. 4A

400B
PORT 1002 402C
SUBCARRIERS 404C
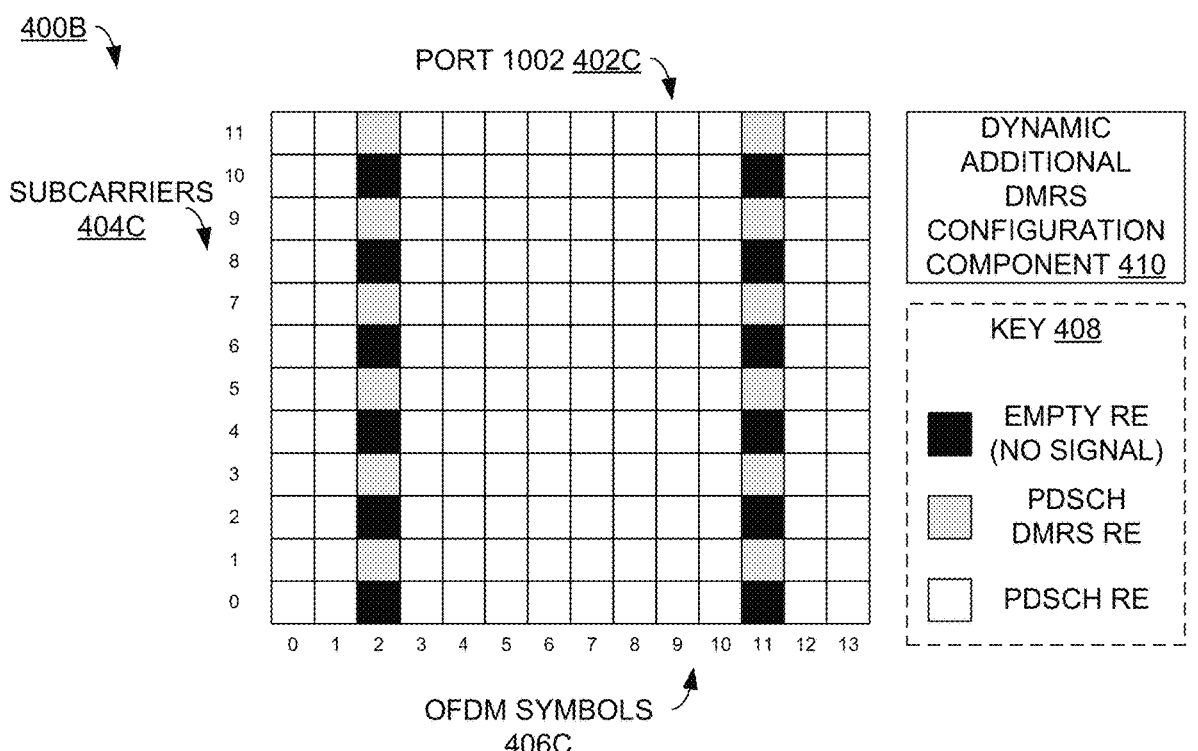
DYNAMIC ADDITIONAL DMRS CONFIGURATION COMPONENT 410
KEY 408
■ EMPTY RE (NO SIGNAL)
▨ PDSCH DMRS RE
☐ PDSCH RE
OFDM SYMBOLS 406C
PORT 1003 402D
SUBCARRIERS 404D
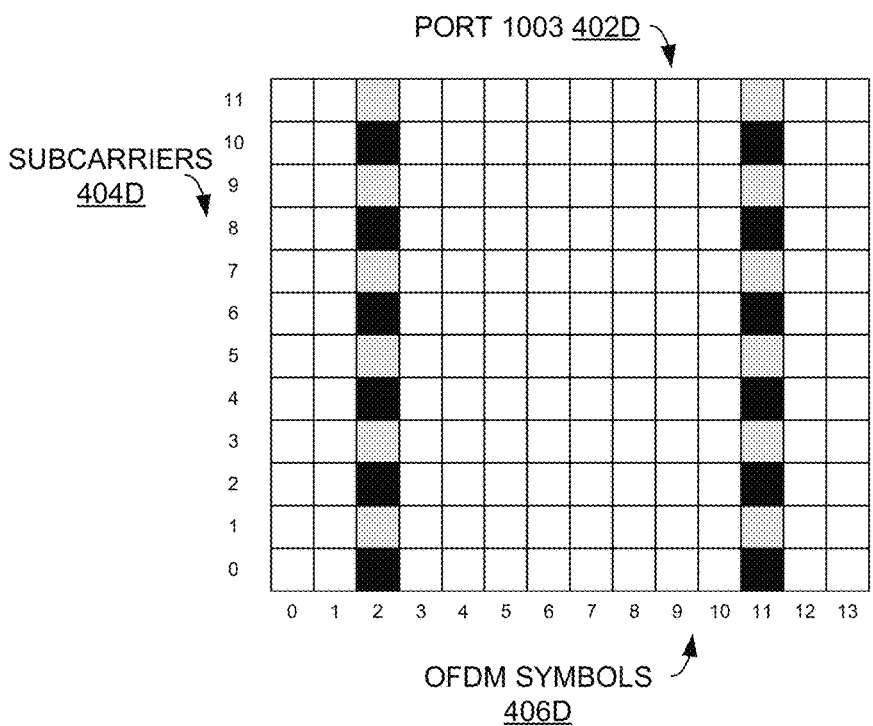
OFDM SYMBOLS 406D
FIG. 4B

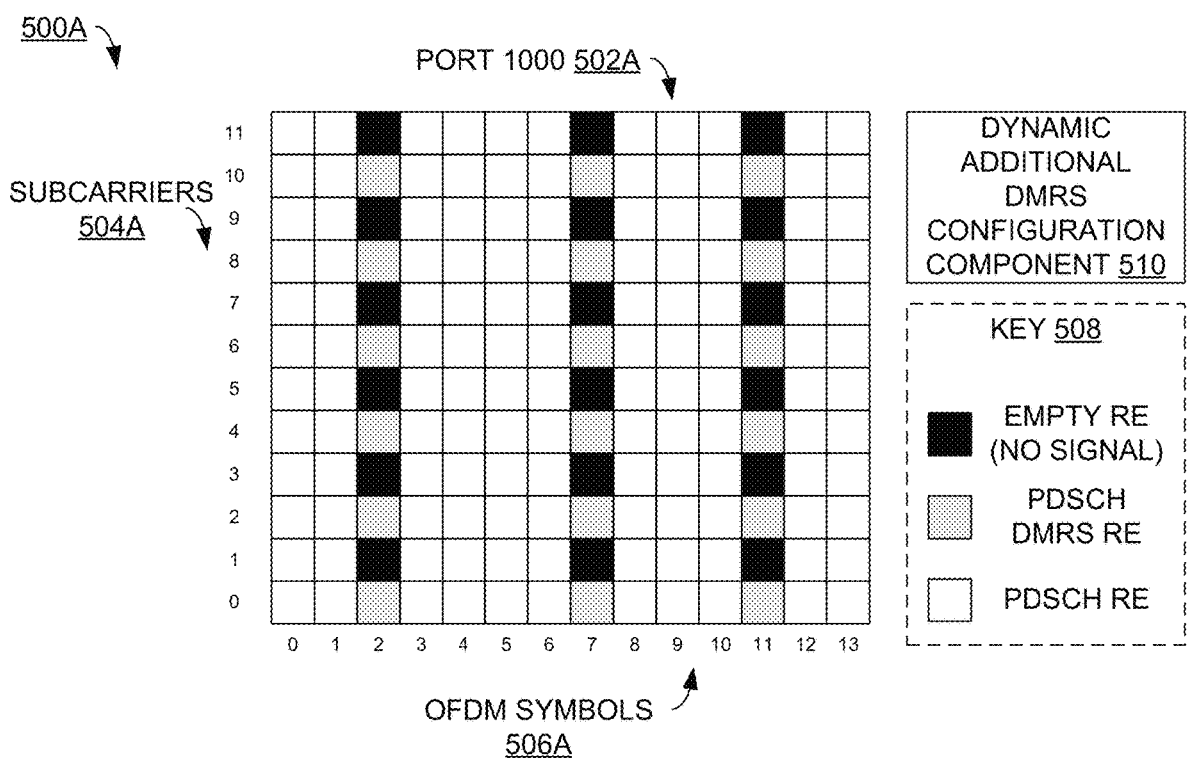
PORT 1000 502A
SUBCARRIERS 504A
OFDM SYMBOLS 506A
DYNAMIC ADDITIONAL DMRS CONFIGURATION COMPONENT 510
KEY 508
EMPTY RE (NO SIGNAL)
PDSCH DMRS RE
PDSCH RE
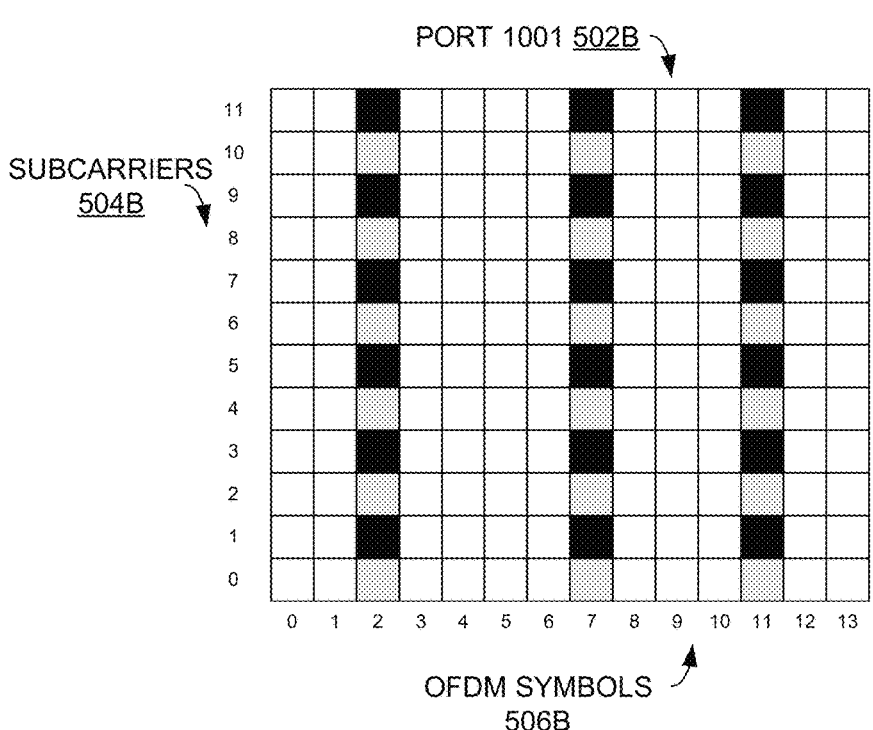
PORT 1001 502B
SUBCARRIERS 504B
OFDM SYMBOLS 506B
FIG. 5A

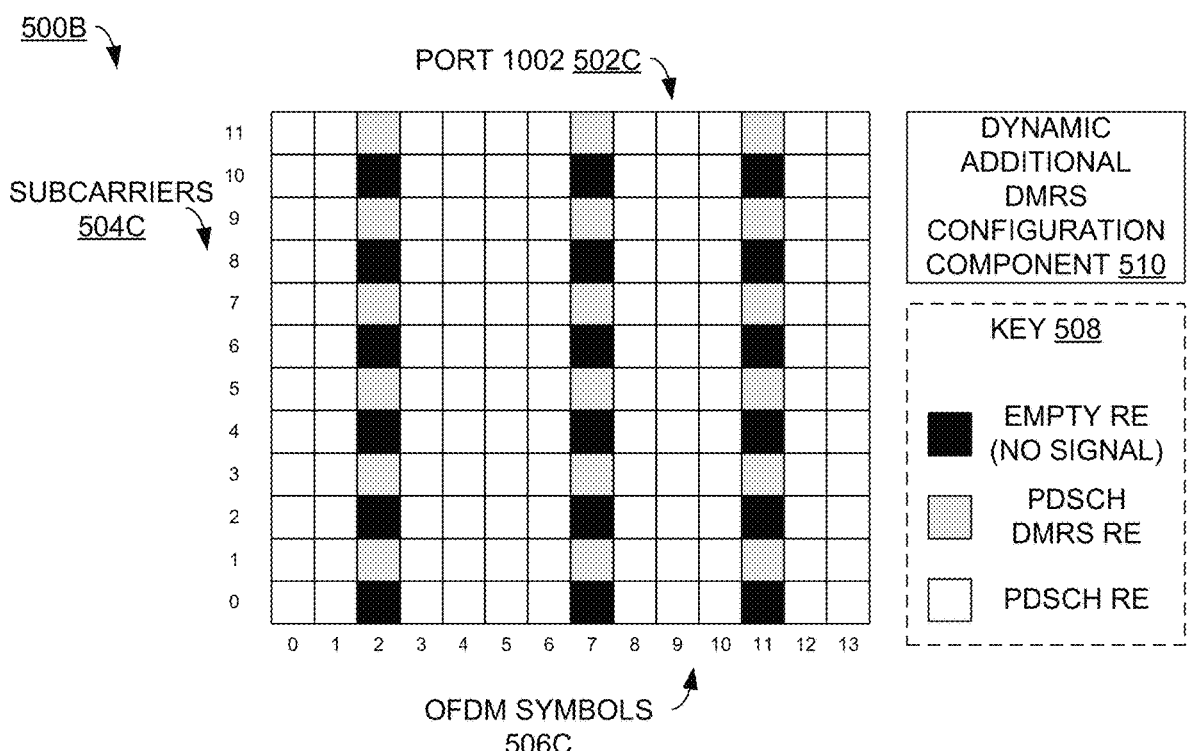
PORT 1002 502C
500B
SUBCARRIERS 504C
OFDM SYMBOLS 506C
DYNAMIC ADDITIONAL DMRS CONFIGURATION COMPONENT 510
KEY 508
■ EMPTY RE (NO SIGNAL)
▨ PDSCH DMRS RE
□ PDSCH RE
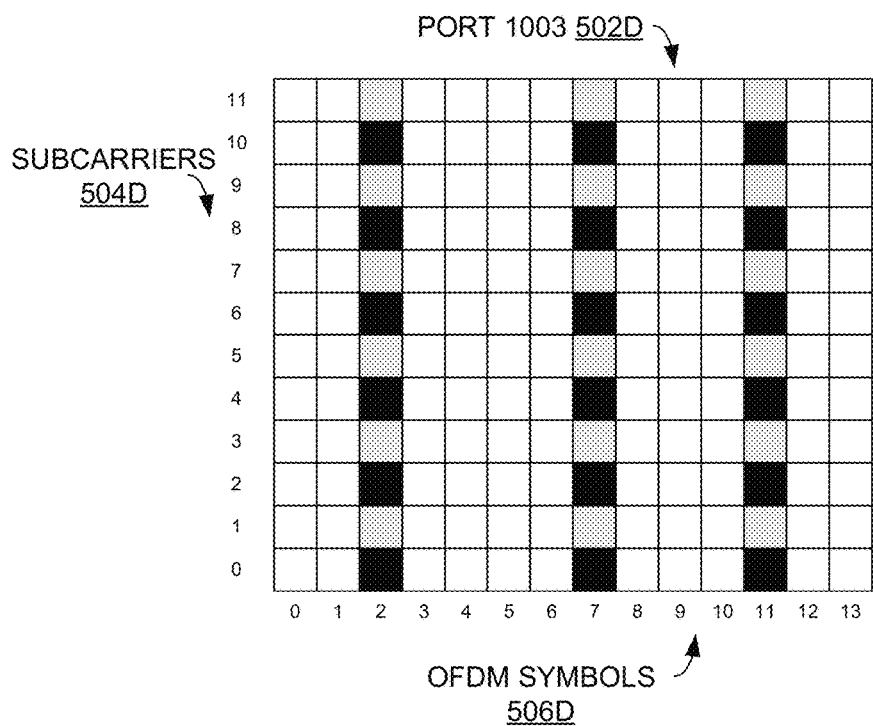
PORT 1003 502D
SUBCARRIERS 504D
OFDM SYMBOLS 506D
FIG. 5B

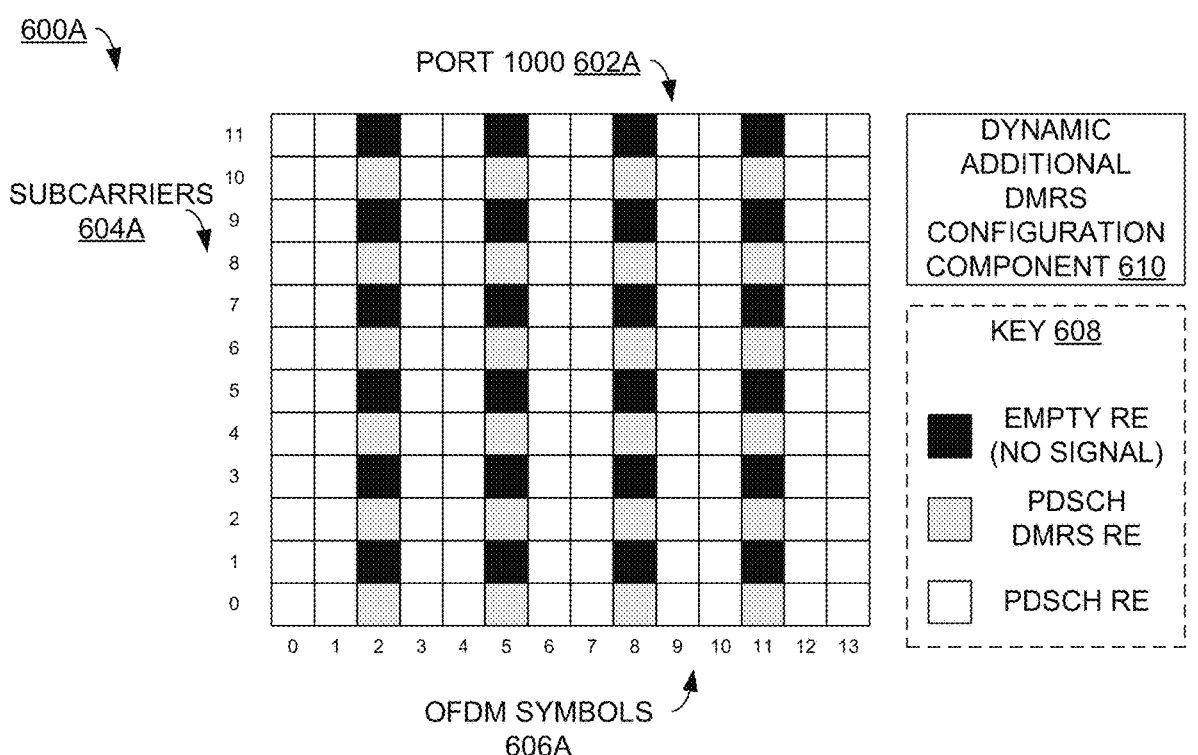
PORT 1000 602A
SUBCARRIERS 604A
OFDM SYMBOLS 606A
DYNAMIC ADDITIONAL DMRS CONFIGURATION COMPONENT 610
KEY 608
EMPTY RE (NO SIGNAL)
PDSCH DMRS RE
PDSCH RE
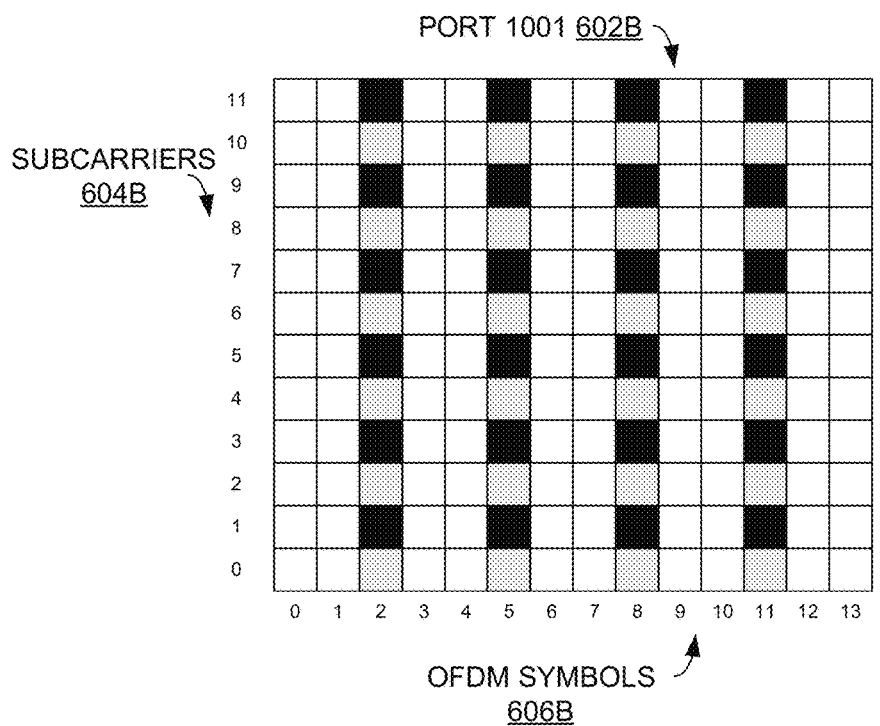
PORT 1001 602B
SUBCARRIERS 604B
OFDM SYMBOLS 606B
FIG. 6A 600B
PORT 1002 602C
SUBCARRIERS 604C
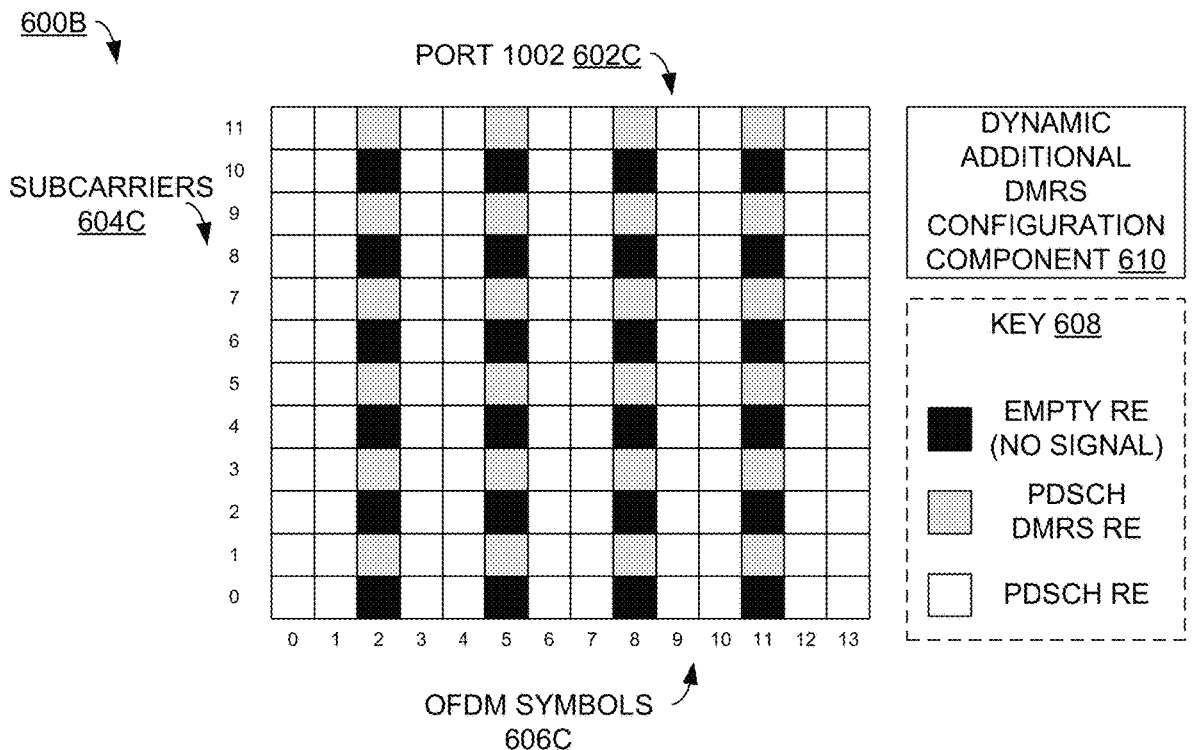
OFDM SYMBOLS 606C
DYNAMIC ADDITIONAL DMRS CONFIGURATION COMPONENT 610
KEY 608
■ EMPTY RE (NO SIGNAL)
▦ PDSCH DMRS RE
□ PDSCH RE
PORT 1003 602D
SUBCARRIERS 604D
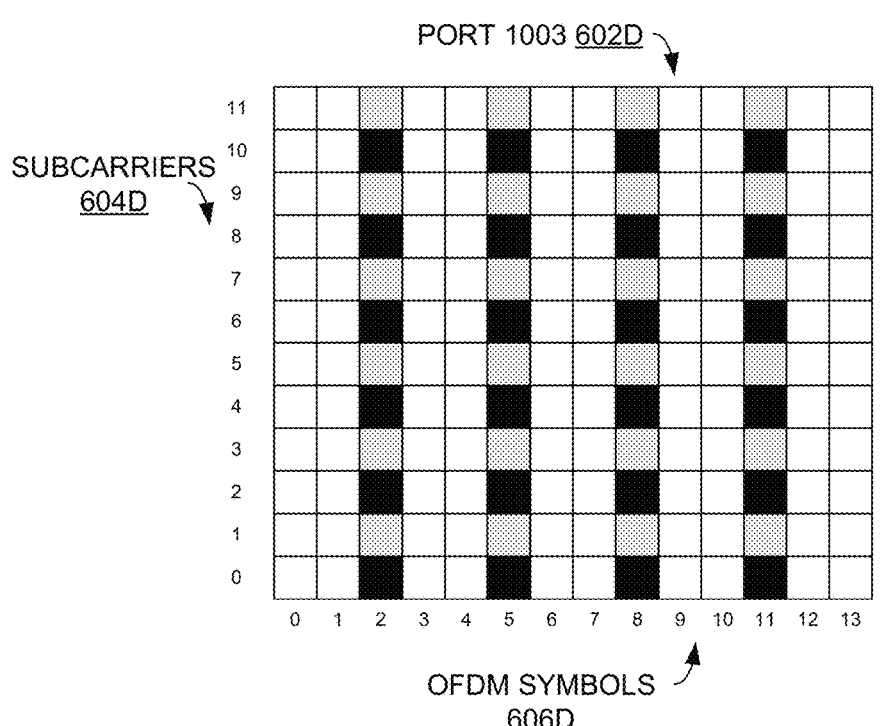
OFDM SYMBOLS 606D
FIG. 6B

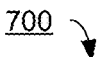
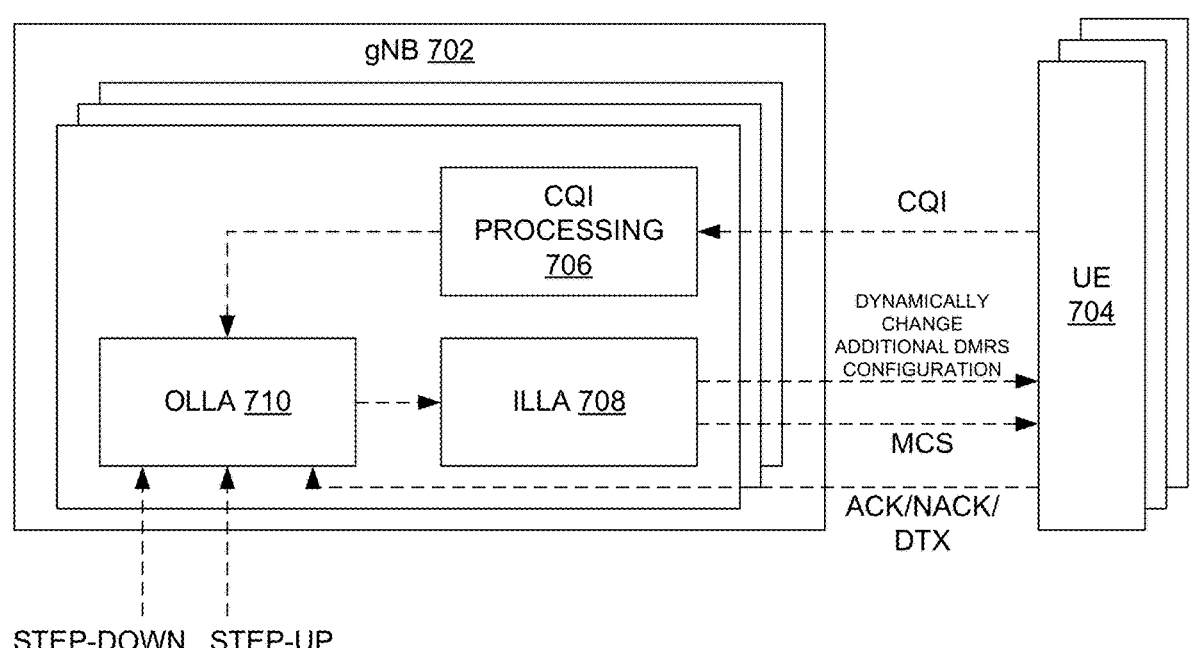
FIG. 7

1000

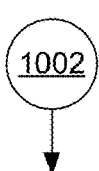

1002

CONFIGURING A FIRST NUMBER OF DEMODULATION REFERENCE SIGNAL POSITIONS IN RADIO RESOURCE CONTROL INFORMATION AS PART OF A CONNECTION SETUP WITH A BASE STATION THAT IS CONFIGURED TO FACILITATE FIRST BROADBAND CELLULAR COMMUNICATIONS 1004

AFTER ATTACHING TO THE BASE STATION, RECEIVING A MESSAGE FROM THE BASE STATION INDICATIVE OF MODIFYING THE FIRST NUMBER OF DEMODULATION REFERENCE SIGNAL POSITIONS TO A SECOND NUMBER OF DEMODULATION REFERENCE SIGNAL POSITIONS 1006

CONDUCTING SECOND BROADBAND CELLULAR COMMUNICATIONS WITH THE BASE STATION ACCORDING TO THE SECOND NUMBER OF DEMODULATION REFERENCE SIGNAL POSITIONS, WHEREIN A THROUGHPUT OF THE SECOND BROADBAND CELLULAR COMMUNICATIONS IS DETERMINED AS A FUNCTION OF A SIZE OF A TRANSPORT BLOCK SET BASED ON THE SECOND NUMBER OF DEMODULATION REFERENCE SIGNAL POSITIONS 1008

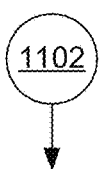

1102

AFTER ATTACHING TO A BASE STATION THAT IS CONFIGURED TO FACILITATE FIRST BROADBAND CELLULAR COMMUNICATIONS, RECEIVING A MESSAGE FROM THE BASE STATION INDICATIVE OF MODIFYING A FIRST NUMBER OF DEMODULATION REFERENCE SIGNAL POSITIONS THAT WAS ESTABLISHED AS PART OF A CONNECTION SETUP TO A SECOND NUMBER OF DEMODULATION REFERENCE SIGNAL POSITIONS 1104

CONDUCTING  BROADBAND CELLULAR COMMUNICATIONS WITH THE BASE STATION ACCORDING TO THE SECOND NUMBER OF DEMODULATION REFERENCE SIGNAL POSITIONS 1106

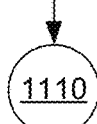

( 1202 )

AFTER ATTACHING TO A BASE STATION THAT IS CONFIGURED TO FACILITATE FIRST BROADBAND CELLULAR COMMUNICATIONS, RECEIVING A MESSAGE FROM THE BASE STATION INDICATIVE OF A MODIFIED NUMBER OF DEMODULATION REFERENCE SIGNAL POSITIONS THAT WAS ESTABLISHED AS PART OF A CONNECTION SETUP 1204

CONDUCTING BROADBAND CELLULAR COMMUNICATIONS WITH THE BASE STATION ACCORDING TO THE MODIFIED NUMBER OF DEMODULATION REFERENCE SIGNAL POSITIONS 1206

DYNAMIC ADDITIONAL DEMODULATION REFERENCE SIGNAL CONFIGURATION

BACKGROUND

In cellular broadband communications, a user equipment and a core network can communicate to configure a protocol to use in making further communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can configure a first number of demodulation reference signal positions in radio resource control information as part of a connection setup with a base station that is configured to facilitate first broadband cellular communications. The system can, after attaching to the base station, receive a message from the base station indicative of modifying the first number of demodulation reference signal positions to a second number of demodulation reference signal positions. The system can conduct second broadband cellular communications with the base station according to the second number of demodulation reference signal positions, wherein a throughput of the second broadband cellular communications is determined as a function of a size of a transport block set based on the second number of demodulation reference signal positions.

An example method can comprise after attaching to a base station that is configured to facilitate first broadband cellular communications, receiving, by a system comprising a processor, a message from the base station indicative of modifying a first number of demodulation reference signal positions that was established as part of a connection setup to a second number of demodulation reference signal positions. The method can further comprise conducting, by the system, broadband cellular communications with the base station according to the second number of demodulation reference signal positions.

An example non-transitory computer-readable medium can comprise instructions that, in response to execution, cause a system comprising a processor to perform operations. These operations can comprise after attaching to a base station that is configured to facilitate first broadband cellular communications, receiving a message from the base station indicative of a modified number of demodulation reference signal positions that was established as part of a connection setup. These operations can further comprise conducting broadband cellular communications with the base station according to the modified number of demodulation reference signal positions.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example demodulation reference signal (DMRS) downlink configuration information element that can facilitate dynamic additional DMRS configuration in accordance with an embodiment of this disclosure;

FIG. 2 illustrates an example DMRS uplink configuration information element that can facilitate dynamic additional DMRS configuration in accordance with an embodiment of this disclosure;

FIGS. 3A and 3B illustrate an example additional DMRS configuration that can facilitate dynamic additional DMRS configuration in accordance with an embodiment of this disclosure;

FIGS. 4A and 4B illustrate another example additional DMRS configuration that can facilitate dynamic additional DMRS configuration in accordance with an embodiment of this disclosure;

FIGS. 5A and 5B illustrate another example additional DMRS configuration that can facilitate dynamic additional DMRS configuration in accordance with an embodiment of this disclosure;

FIGS. 6A and 6B illustrate another example additional DMRS configuration that can facilitate dynamic additional DMRS configuration in accordance with an embodiment of this disclosure;

FIG. 7 illustrates an example system architecture that can facilitate dynamic additional DMRS configuration in accordance with an embodiment of this disclosure;

FIG. 10 illustrates an example process flow that can facilitate dynamic additional DMRS configuration, in accordance with an embodiment of this disclosure;

FIG. 11 illustrates another example process flow that can facilitate dynamic additional DMRS configuration, in accordance with an embodiment of this disclosure;

FIG. 12 illustrates another example process flow that can facilitate dynamic additional DMRS configuration, in accordance with an embodiment of this disclosure;

DETAILED DESCRIPTION

Figure 8A:
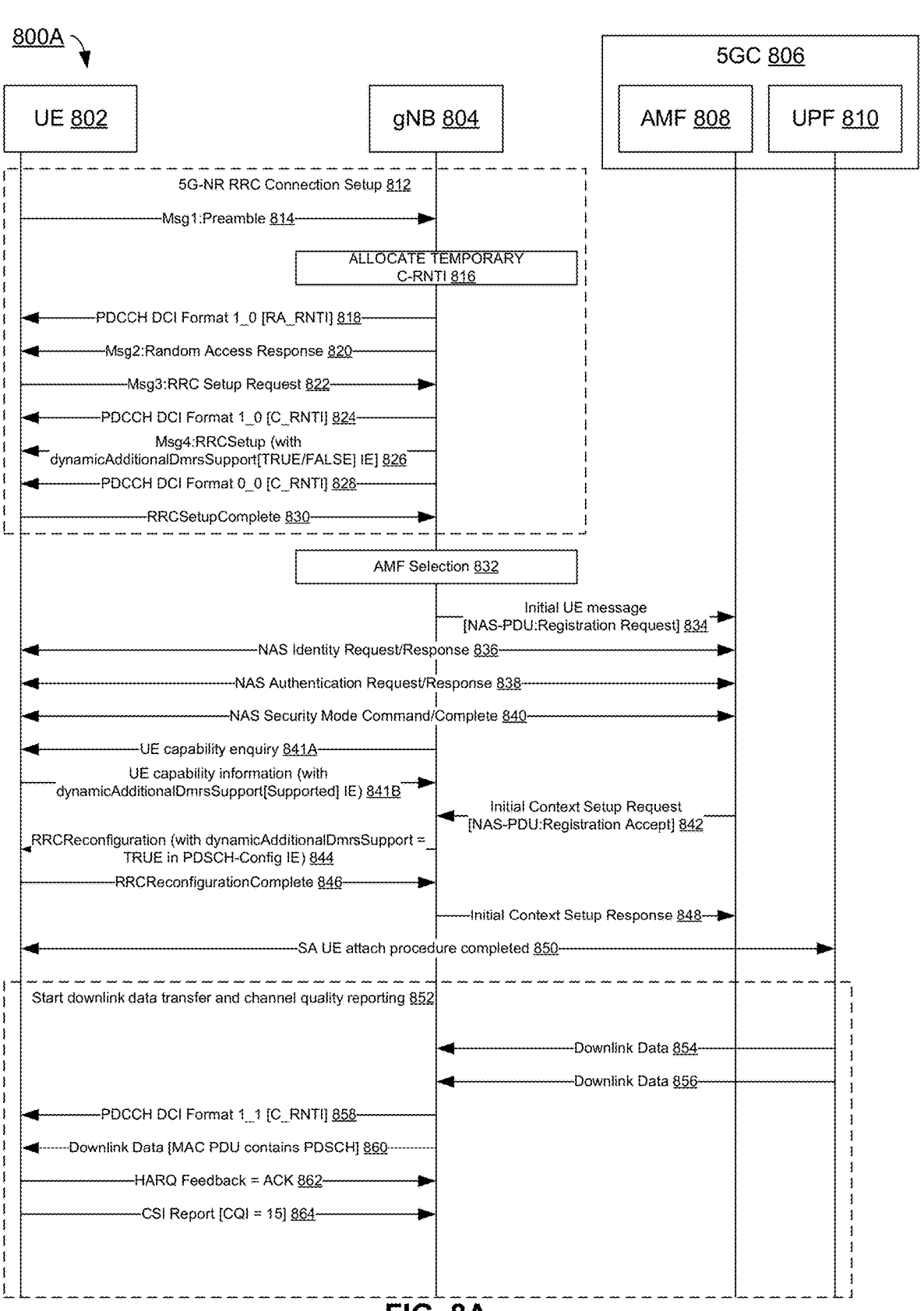
FIGS. 8A and 8B illustrate an example signal flow for dynamic additional DMRS configuration for a downlink, and that can facilitate dynamic additional DMRS configuration in accordance with an embodiment of this disclosure.

The examples described herein can generally relate to actions taken by user equipment in communicating with a base station to dynamically configure additional demodulation reference signals. It can be appreciated that corresponding actions can be taken by a base station to also dynamically configure additional demodulation reference signals.

The examples herein generally relate to 5G cellular communications networks. It can be appreciated that the present techniques can be applied to other types of cellular communications networks for dynamically configuring additional demodulation reference signals (DMRSes).

A DMRS can be utilized by a 5G new radio (NR) receiver to produce channel estimates for demodulation of an associated physical channel A design and mapping of each DMRS can be specific to each 5G physical channel (e.g., physical broadcast channel (PBCH), physical downlink control channel (PDCCH), physical downlink shared channel (PDSCH), physical uplink control channel (PUSCH), and physical uplink shared channel (PUCCH)). DMRS can be user equipment (UE) specific, and be transmitted on demand In some examples, a DMRS does not extend outside of a scheduled physical resource of a channel it supports. DMRS can support massive multi-user multiple-input and multiple-output (MIMO). DMRS can be beamformed and, in some examples, support up to 12 orthogonal layers. A DMRS sequence for a cyclic-prefix orthogonal frequency division multiplexing (CP-OFDM) version can be quadrature phase shift keying (QPSK) based on Gold Sequences.

With respect to PDSCH, DMRS can comprise front-loaded DMRS symbols (e.g., either 1 or 2) that are located as follows:

1. Slot based (DMRS mapping type-A): This can be a fixed orthogonal frequency division multiplexing (OFDM) symbol regardless of PDSCH assignment and that is configurable between lo={2,3}.
2. Non-slot based (DMRS mapping type-B): This can be a first OFDM symbol assigned for PDSCH—e.g., mini slots.

In some examples, additional DMRS symbols can be configured in scenarios such as high-speed mobility (e.g., handover); when downlink (DL)/uplink (UL) block error ratio (BLER) is high, and UE-reported channel condition is poor; and when a UE is located on a cell edge, and, because of that, the UE is not able to decode or send DL and UL packets.

With regard to PUSCH DMRS, in an uplink, it can be that two waveform types are supported (e.g., CP-OFDM, and discrete Fourier transform-spread orthogonal frequency division multiplexing (DFT-S-OFDM)). A gold sequence can be used in CP-OFDM, and a Zadoff-Chu sequence can be used in DFT-S-OFDM. Front loaded DMRS symbols (e.g., either 1 or 2) can be located at a first OFDM symbol that is assigned for PUSCH.

The present techniques can be implemented to solve the following problems.

One problem that can be solved by implementing the present techniques can be when a 5G base station (sometimes referred to as gNodeB or gNB; or more generally a base station) includes an dmrs-AdditionalPosition information element (IE) using DMRS-DownlinkConfig and DMRS-UplinkConfig for downlink and uplink, respectively, during UE attach or another UE-specific procedure, then that configuration can stay with the UE during the lifetime of the scenario unless it is modified by a radio resource control (RRC) modification procedure.

A dmrs-AdditionalPosition IE for DL and UL is indicated in FIGS. 1 and 2, respectively. That is, FIG. 1 illustrates an example DMRS downlink configuration information element 100 that can facilitate dynamic additional DMRS configuration in accordance with an embodiment of this disclosure. In example DMRS downlink configuration information element 100, there is dmrs-AdditionalPosition 102.

And FIG. 2 illustrates an example DMRS uplink configuration information element 200 that can facilitate dynamic additional DMRS configuration in accordance with an embodiment of this disclosure. In example DMRS uplink configuration information element 200, there is dmrs-AdditionalPosition 202.

Once this configuration is received by the UE, then the gNB and the UE can consider that configuration while determining a transport block (TB; which can generally determine data throughput of the UE). A TB can vary based on a number of additional DMRS positions that are configured.

Data throughput (TP) can be inversely proportional to a number of configured additional DMRS positions—that is, where more additional DMRS symbols are configured then there can be less data throughput.

FIGS. 3A and 3B illustrate an example additional DMRS configuration 300A and 300B that can facilitate dynamic additional DMRS configuration in accordance with an embodiment of this disclosure. Example additional DMRS configuration 300A and 300B (as well as example additional DMRS configuration 400A and 400B of FIGS. 4A and 4B; example additional DMRS configuration 500A and 500B of FIGS. 5A and 5B; and example additional DMRS configuration 600A and 600B of FIGS. 6A and 6B) can have the following settings:

pdsch.NumLayers=4;
pdsch.MappingType='A';
pdsch.SymbolAllocation=[0 13]; % [startSymbol Length]
dmrs.DMRSconfigurationType=1;
dmrs.DMRSLength=1;
dmrs.DMRSTypeAPosition=2;
dmrs.NumCDMGroupsWithoutData=2;
dmrs.NIDNSCID=10;
dmrs.NSCID=0;

Additionally, example additional DMRS configuration 300A and 300B has "dmrs.DMRSAdditionalPosition=0;" which indicates that there are no additional DMRS positions configured. This configuration is illustrated in additional DMRS configuration 300A and 300B, which comprises port 1000 302A (with subcarriers 304A and OFDM symbols 306A); port 1001 302B (with subcarriers 304B and OFDM symbols 306B); port 1002 302C (with subcarriers 304C and OFDM symbols 306C); and port 1003 302D (with subcarriers 304D and OFDM symbols 306D).

Example additional DMRS configuration 300A and 300B also comprises dynamic additional DMRS configuration component 310 (which can comprise a computer component that implements the present techniques) and key 308. As depicted, FIGS. 3A and 3B relate to a 4-port antenna configuration, and dynamic additional DMRS configuration component 310 can comprise a 4-port dynamic additional DMRS configuration component.

FIGS. 4A and 4B illustrate another example additional DMRS configuration 400A and 400B that can facilitate dynamic additional DMRS configuration in accordance with an embodiment of this disclosure.

Example additional DMRS configuration 400A and 400B has "dmrs.DMRSAdditionalPosition=1;" which indicates that there is one additional DMRS position configured. This configuration is illustrated in additional DMRS configuration 400A and 400B, which comprises port 1000 402A (with subcarriers 404A and OFDM symbols 406A); port 1001 402B (with subcarriers 404B and OFDM symbols 406B); port 1002 402C (with subcarriers 404C and OFDM symbols 406C); and port 1003 402D (with subcarriers 404D and OFDM symbols 406D).

Example additional DMRS configuration 400A and 400B also comprises dynamic additional DMRS configuration component 410 (which can comprise a computer component that implements the present techniques) and key 408.

FIGS. 5A and 5B illustrate another example additional DMRS configuration 500A and 500B that can facilitate dynamic additional DMRS configuration in accordance with an embodiment of this disclosure.

Example additional DMRS configuration 500A and 500B has "dmrs.DMRSAdditionalPosition=2;" which indicates that there are two additional DMRS positions configured. This configuration is illustrated in additional DMRS configuration 500A and 500B, which comprises port 1000 502A (with subcarriers 504A and OFDM symbols 506A); port 1001 502B (with subcarriers 504B and OFDM symbols 506B); port 1002 502C (with subcarriers 504C and OFDM symbols 506C); and port 1003 502D (with subcarriers 504D and OFDM symbols 506D).

Example additional DMRS configuration 500A and 500B also comprises dynamic additional DMRS configuration component 510 (which can comprise a computer component that implements the present techniques) and key 508.

FIGS. 6A and 6B illustrate another example additional DMRS configuration 600A and 600B that can facilitate dynamic additional DMRS configuration in accordance with an embodiment of this disclosure.

Example additional DMRS configuration 600A and 600B has "dmrs.DMRSAdditionalPosition=3;" which indicates that there are three additional DMRS positions configured. This configuration is illustrated in additional DMRS configuration 600A and 600B, which comprises port 1000 602A (with subcarriers 604A and OFDM symbols 606A); port 1001 602B (with subcarriers 604B and OFDM symbols 606B); port 1002 602C (with subcarriers 604C and OFDM symbols 606C); and port 1003 602D (with subcarriers 604D and OFDM symbols 606D).

Example additional DMRS configuration 600A and 600B also comprises dynamic additional DMRS configuration component 610 (which can comprise a computer component that implements the present techniques) and key 608.

In the example of FIGS. 3A and 3B, there is no additional DMRS configured. In the example of FIGS. 4A and 4B, there is one additional DMRS symbol configured. In the example of FIGS. 5A and 5B, there are two additional DMRS symbols configured. In the example of FIGS. 6A and 6B, there are three additional DMRS symbols configured. So, in these examples, data throughput in FIGS. 3A and 3B can be greater than in FIGS. 4A and 4B, which can be greater than in FIGS. 5A and 5B, which can be greater than in FIGS. 6A and 6B.

As part of dynamically configuring additional DMRS positions, a component (e.g., dynamic additional DMRS configuration component 310 of FIGS. 3A and 3B) can dynamically switch between the configurations of FIGS. 4A and 4B, 5A and 5B, and 6A and 6B

One problem with additional DMRS configuration can be physical resource block (PRB) wastage because of an unnecessarily-configured higher additional DMRS position. Implementing the present techniques to dynamically change the additional DMRS position can be implemented to solve this problem.

Take an example where, during UE attach, a gNB configured an additional DMRS configuration in pos3 (indicating 3 additional DMRS symbols). Where radio/channel condition is good, where the UE is reporting a channel quality indicator (CQI), and UL and DL data BLER % are under 1% (indicating that a PDSCH and PUSCH packet decoding success rate is high), then having 3 symbols for additional DMRS can negatively impact data throughput.

Some prior approaches do not allow changing this configuration dynamically, and because of that, the gNB can be unnecessarily wasting a physical resource block.

Another problem with additional DMRS configuration can relate to frequent UE release, or a UE performing a RRC reestablishment procedure because channel condition is poor. Implementing the present techniques to dynamically change the additional DMRS position can be implemented to solve this problem.

Take an example where, during UE attach, the gNB has not configured an additional DMRS configuration in DL and or UL. Where radio/channel condition is poor, where the UE is reporting CQI and UL and DL BLER % is high (e.g., >20%, which can indicate that a success rate of decoding PDSCH and PUSCH packets is poor), it can be that the UE or gNB can perform a UE release or RRC reestablishment procedure. This procedure can take a long time to restore the connection. This problem can be avoided by dynamically configuring additional DMRS positions to sustain the connection. In some prior approaches, this configuration cannot be dynamically altered.

Another problem with additional DMRS configuration can relate to a high-speed mobility (handover) scenario. In a high-speed handover scenario, channel/radio condition can be kept on very frequently, to sustain and maintain good quality for a call. Additional DMRS symbols can be adapted dynamically based on reported CQI and BLER, to achieve good throughput, while also not compromising by wasting physical resources.

Another problem with additional DMRS configuration can relate to a scenario where a UE is located at a cell edge. It can be that, when a UE is located at a cell edge, the UE's channel quality is subpar, BLER % can be high. To improve this condition, a gNB can quickly adapt an additional DMRS configuration. It can be that adapting a DMRS configuration based on link adaptation is not supported by prior approaches.

The present techniques for dynamic additional DMRS configuration can be implemented as follows.

In some examples, a new field (e.g., "additional DMRS indicator") can be implemented for downlink and uplink DL in downlink control information (DCI). A field for downlink can be added in DCI format 1_1. A field for uplink can be added in DCI format 0_1.

In some examples, an IE in UE capability for downlink and uplink can be implemented to support dynamic additional DMRS configuration. An IE ("dynamicAdditionalDMRS Support") for downlink can be implemented in FeatureSetDownlink. Where a UE supports this IE, it can mean that the UE supports dynamic additional DMRS configuration change in the downlink direction.

An IE ("dynamicAdditionalDMRSSupport") for uplink can be implemented in FeatureSetUplink. Where a UE supports this IE, it can mean that the UE supports dynamic additional DMRS configuration change in the uplink direction.

In some examples, an IE ("dynamicAdditionalDmrsSupport") can be implemented in PDSCH-Config for downlink, and in PUSCH-Config for uplink.

FIG. 7 illustrates an example system architecture 700 that can facilitate dynamic additional DMRS configuration in accordance with an embodiment of this disclosure. System architecture comprises gNB 702, UE 704, CQI processing 706, inner loop link adaptation (ILLA) 708, and gNB outer loop link adaptation (OLLA) 710 (which, in some examples, can more generally be a base station outer loop link adaptation).

In some examples, gNB 702 can determine additional DMRS information dynamically, as follows. As depicted in FIG. 7, where UE 704 is reporting channel quality using CQI, and hybrid automatic repeat request (HARQ) feedback (e.g., acknowledgment (ACK), negative acknowledgment (NACK), and discontinuous transmission (DTX)) for data transmission then, OLLA 710 can handle the HARQ feedback, and CQI processing 706 can handle CQI reported by UE 704.

Based on these two inputs, ILLA 708 can determine a modulation coding scheme (MCS) and additional DMRS position to be applied to UL and DL data transmission.

ILLA 708 can determine the MCS by considering the CQI reported by UE 704, and HARQ feedback. In some examples, the higher the MCS, the better the channel/radio quality, meaning a smaller number of additional DMRS positions configured to UE 704 using the present techniques.

Where ILLA 708 determines to use a lower MCS, meaning the channel quality reported by UE 704 is not good and BLER is high, this can mean that ILLA 708 determines to increase the additional DMRS position in DL/UL DCI to decrease the BLER %.

The following can be communicated as part of conveying capability of a UE. A FeatureSetCombination information element can be as follows:

```
-- ASN1START
-- TAG-FEATURESETCOMBINATION-START
FeatureSetCombination ::=          SEQUENCE (SIZE
(1..maxSimultaneousBands)) OF FeatureSetsPerBand
FeatureSetsPerBand ::=            SEQUENCE (SIZE
(1..maxFeatureSetsPerBand)) OF FeatureSet
FeatureSet ::=                    CHOICE {
   eutra                         SEQUENCE {
      downlinkSetEUTRA           FeatureSetEUTRA-
DownlinkId,
      uplinkSetEUTRA             FeatureSetEUTRA-
UplinkId
   },
   nr                            SEQUENCE {
      downlinkSetNR
FeatureSetDownlinkId,
      uplinkSetNR                FeatureSetUplinkId
   }
}
-- TAG-FEATURESETCOMBINATION-STOP
-- ASN1STOP
```

An IE, FeatureSetDownlink, can indicate a set of features that a UE supports on carriers corresponding to one band entry in a band combination. A FeatureSetDownlink IE can be as follows:

```
-- ASN1START
-- TAG-FEATURESETDOWNLINK-START
FeatureSetDownlink ::=              SEQUENCE {
   featureSetListPerDownlinkCC      SEQUENCE (SIZE
(1..maxNrofServingCells)) OF FeatureSetDownlinkPerCC-Id,
   intraBandFreqSeparationDL
FreqSeparationClass
OPTIONAL,
   scalingFactor                   ENUMERATED
{f0p4, f0p75, f0p8}
OPTIONAL,
   crossCarrierScheduling-OtherSCS  ENUMERATED
{supported}
OPTIONAL,
   scellWithoutSSB                  ENUMERATED
{supported}
OPTIONAL,
   csi-RS-MeasSCellWithoutSSB       ENUMERATED
{supported}
OPTIONAL,
   ....................
      -- An IE to indicate UE capability to support downlink
dynamic additional DMRS feature.
   dynamicAdditionalDMRSSupport     ENUMERATED
{supported}
OPTIONAL,
   ....................
   dummy1                          ENUMERATED
{supported}
OPTIONAL,
   dummy6                          SEQUENCE (SIZE
```

-continued

```
(1.. maxNrofCodebooks)) OF DummyD
OPTIONAL,
   dummy7                          SEQUENCE (SIZE
(1.. maxNrofCodebooks)) OF DummyE
OPTIONAL
}
-- TAG-FEATURESETDOWNLINK-STOP
-- ASN1STOP
```

In a FeatureSetDownlink IE, a UE can set a dynamicAdditionalDMRS Support field to support where the UE is capable of supporting downlink additional DMRS features.

An IE, FeatureSetUplink, can indicate a set of features that a UE supports on carriers corresponding to one band entry in a band combination. A FeatureSetUplink IE can be as follows:

```
-- ASN1START
-- TAG-FEATURESETUPLINK-START
FeatureSetUplink ::=               SEQUENCE {
   featureSetListPerUplinkCC       SEQUENCE (SIZE (1..
maxNrofServingCells)) OF FeatureSetUplinkPerCC-Id,
   scalingFactor                   ENUMERATED {f0p4,
f0p75, f0p8}
OPTIONAL,
   crossCarrierScheduling-OtherSCS  ENUMERATED
{supported}
OPTIONAL,
   intraBandFreqSeparationUL        FreqSeparationClass
OPTIONAL,
   searchSpaceSharingCA-UL          ENUMERATED
{supported}
OPTIONAL,
   ....................
      -- An IE to indicate UE capability to support Uplink
dynamic additional DMRS feature.
   dynamicAdditionalDMRSSupport     ENUMERATED
{supported}
OPTIONAL,
   ....................
   dummy1                          DummyI
OPTIONAL,
   supportedSRS-Resources          SRS-Resources
OPTIONAL,
   twoPUCCH-Group                  ENUMERATED
{supported}
OPTIONAL,
   dynamicSwitchSUL                ENUMERATED
{supported}
OPTIONAL,
   simultaneousTxSUL-NonSUL        ENUMERATED
{supported}
OPTIONAL,
   pusch-ProcessingType1-DifferentTB-PerSlot SEQUENCE {
      scs-15kHz                    ENUMERATED
{upto2, upto4, upto7}
OPTIONAL,
      scs-30kHz                    ENUMERATED
{upto2, upto4, upto7}
OPTIONAL,
      scs-60kHz                    ENUMERATED
{upto2, upto4, upto7}
OPTIONAL,
      scs-120kHz                   ENUMERATED
{upto2, upto4, upto7}
OPTIONAL
   }
OPTIONAL,
   dummy2                          DummyF
OPTIONAL
}
-- TAG-FEATURESETUPLINK-STOP
-- ASN1STOP
```

In a FeatureSetUplink IE, a UE can set a dynamicAdditionalDMRSSupport field to support where the UE is capable of supporting uplink additional DMRS features.

A PDSCH-Config IE that is used to configure a UE's specific PDSCH parameters can be as follows:

```
-- ASN1START
-- TAG-PDSCH-CONFIG-START
PDSCH-Config ::=                              SEQUENCE {
        dataScramblingIdentityPDSCH           INTEGER
(0..1023)
OPTIONAL,   -- Need S
        dmrs-DownlinkForPDSCH-MappingTypeA    SetupRelease {
DMRS-DownlinkConfig }
OPTIONAL,   -- Need M
        dmrs-DownlinkForPDSCH-MappingTypeB    SetupRelease {
DMRS-DownlinkConfig }
OPTIONAL,   -- Need M
        ..............
        ..............
        -- An IE to support dynamic additional DMRS position
change.
        dynamicAdditionalDmrsSupport          ENUMERATED
{enabled}   OPTIONAL,   -- Need S
        ..............
        ..............
        tci-StatesToAddModList                SEQUENCE
(SIZE(1..maxNrofTCI-States)) OF TCI-State
OPTIONAL,   -- Need N
        pdsch-TimeDomainAllocationList-r16    SetupRelease {
PDSCH-TimeDomainResourceAllocationList-r16 }
OPTIONAL,   -- Need M
        repetitionSchemeConfig-r16            SetupRelease {
RepetitionSchemeConfig-r16}                   OPTIONAL
-- Need M
        ]]
        }
}
-- TAG-PDSCH-CONFIG-STOP
-- ASN1STOP
```

In a PDSCH-Config, where a dynamicAdditionalDmrs-Support IE is configured to indicate that an additional DMRS feature is enabled, then a gNB can include "additional DMRS indicator" in downlink DCI format 1_1. In some examples, it can be that, otherwise, this feature is not supported if this field is absent.

An IE, PUSCH-Config, that can be used to configure UE specific PUSCH parameters applicable to a particular band width part (BWP) can be as follows:

```
-- ASN1START
-- TAG-PUSCH-CONFIG-START
PUSCH-Config ::=                              SEQUENCE {
        dataScramblingIdentityPUSCH           INTEGER
(0..1023)
OPTIONAL,   -- Need S
        txConfig                              ENUMERATED
{codebook, nonCodebook}
OPTIONAL,   -- Need S
        dmrs-UplinkForPUSCH-MappingTypeA      SetupRelease {
DMRS-UplinkConfig }
OPTIONAL,   -- Need M
        dmrs-UplinkForPUSCH-MappingTypeB      SetupRelease {
DMRS-UplinkConfig }
OPTIONAL,   -- Need M
        ..............
        ..............
        -- Newly proposed IE to support dynamic additional
DMRS position change.
        dynamicAdditionalDmrsSupport          ENUMERATED
{enabled}   OPTIONAL,   -- Need S
        ..............
        ..............
}
-- TAG-PUSCH-CONFIG-STOP
        -- ASN1STOP
```

In a PUSCH-Config, where a dynamicAdditionalDmrs-Support IE is configured to indicate that an additional DMRS feature is enabled, then a gNB can include "additional DMRS indicator" in uplink DCI format 0_1. In some examples, it can be that, otherwise, this feature is not supported if this field is absent.

In some examples, DL DCI format 1_1 can include the following field relating to additional DMRS symbol configuration:

| Field (Item) | Bits | Description |
|---|---|---|
| Additional DMRS Indicator | 2 | Additional DMRS Symbol configuration<br>0 - If no Additional DMRS symbol configured.<br>1 - One additional DMRS symbol configured.<br>2 - two additional DMRS symbols configured.<br>3 - Three additional DMRS symbols configured. |

In some examples, UL DCI format 0_1 can include the following field relating to additional DMRS symbol configuration:

| Field (Item) | Bits | Description |
|---|---|---|
| Additional DMRS Indicator | 2 | Additional DMRS Symbol configuration<br>0 - If no Additional DMRS symbol configured.<br>1 - One additional DMRS symbol configured.<br>2 - two additional DMRS symbols configured.<br>3 - Three additional DMRS symbols configured. |

FIG. 8 illustrates an example signal flow 800 for dynamic additional DMRS configuration for a downlink, and that can facilitate dynamic additional DMRS configuration in accordance with an embodiment of this disclosure. As depicted, in signal flow 800, communications are sent between user equipment 802, gNB 804, and 5G core (5GC) 806 (which comprises access and mobility management function (AMF) 808 and user plane function (UPF) 810).

The signal flow of signal flow 800 is an example signal flow, and there can be signal flows that implement different signals, or the signals of signal flow 800 in a different order, as part of facilitating dynamic additional DMRS configuration.

As depicted in signal flow 800, the following occurs:
5G-NR RRC connection setup 812
Msg1:Preamble 814
Allocate temporary Cell Radio Network Temporary Identifier (C-RNTI) 816
PDCCH DCI Format 1_0 [Random Access RNTI (RA_RNTI)] 818
Msg2:Random Access Response 820
Msg3:RRCSetupRequest 822
PDCCH DCI Format 1_0 [C_RNTI] 824
Msg4:RRCSetup 826, where a dynamicAdditionalDmrs-Support[TRUE/FALSE] IE is contained in this message, and can be added as part of the present techniques
PDCCH DCI Format 0_0 [C_RNTI] 828
RRCSetupComplete 830
AMF Selection 832

Initial UE message [Non-Access-Stratum-Protocol Data Unit (NAS-PDU):Registration Request] 834

NAS Identity Request/Response 836

NAS Authentication Request/Response 838

NAS Security Mode Command/Complete 840

UE capability enquiry 841A

UE capability information, with dynamicAdditionalDmrsSupport[Supported] IE in FeatureSetDownlink 841B Initial Context Setup Request [NAS-PDU:Registration Accept] 842

RRCReconfiguration with dynamicAdditionalDmrsSupport=TRUE in PDSCH-Config IE where UE supports this feature in downlink 844 (which can indicate that the UE already supports a dynamic additional DMRS feature that is communicated by the UE in 841B as part of UE capability information; here, a gNB can add this IE in a RRCE Reconfiguration message)

RRCReconfigurationComplete 846

Initial Context Setup Response 848

Standalone (SA) UE attach procedure completed 850

Start downlink data transfer and channel quality reporting 852

Downlink data 854

Downlink data 856

PDCCH DCI Format 1_1 [C_RNTI] 858

Downlink Data [Medium Access Control (MAC) PDU contains PDSCH] 860

HARQ Feedback=ACK 862

Channel State Information (CSI) Report [CQI=15] 864

DL data decoding failed at UE 866

CSI Report [CQI=9, 7, 6, . . . ] 868

Channel condition gets worse 870

CSI Report [CQI=4, 5, 1, . . . ] 572

PDCCH DCI Format 1_1 [C_RNTI] 874

Downlink Data [MAC PDU contains PDSCH] 876

HARQ Feedback=NACK 878

HARQ Feedback=DTX 880

Trigger/change additional DMRS configuration in DL DCI because condition met 882, where, in some examples, a condition can be CQI reporting is bad for a certain threshold and period; HARQ feedback is reported as NACK (e.g., BLER is high for a certain threshold and period); UE is on a cell edge; and/or UE is on high mobility Downlink Data 884

PDCCH DCI Format 1_1 [with additional DMRS indicator field] 886, where the additional DMRS indicator field can be implemented as part of the present techniques Downlink Data [MAC PDU contains PDSCH] 888

HARQ Feedback=ACK 890

Downlink Data 892

Improvement seen in UE throughput for DL Data 894

DL Data transfer continues 896

Figure 9A:
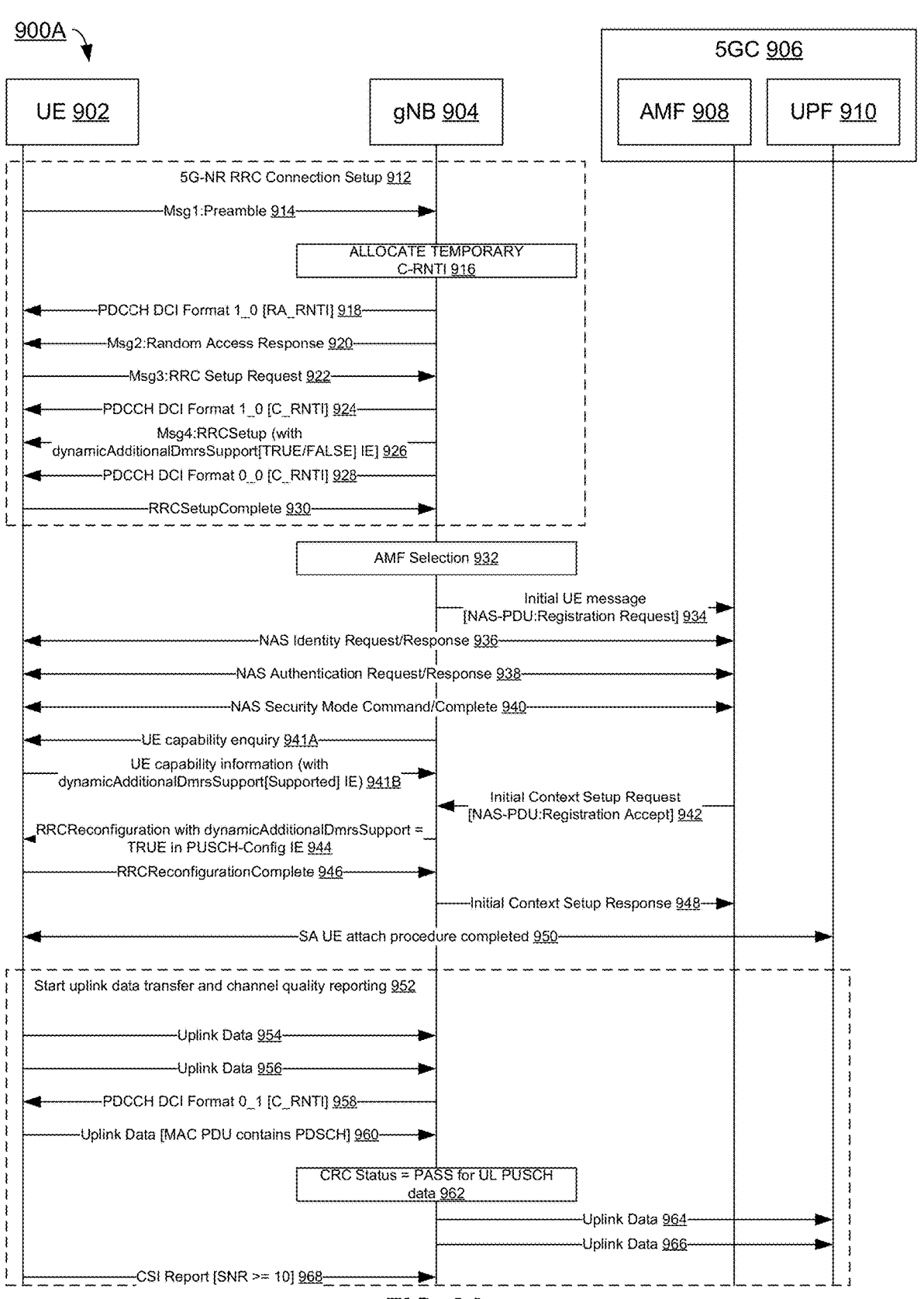
FIGS. 9A and 9B illustrates an example signal flow for dynamic additional DMRS configuration for a uplink, and that can facilitate dynamic additional DMRS configuration in accordance with an embodiment of this disclosure.

FIG. 9 illustrates an example signal flow for dynamic additional DMRS configuration for a uplink, and that can facilitate dynamic additional DMRS configuration in accordance with an embodiment of this disclosure.

As depicted, in signal flow 900, communications are sent between user equipment 902, gNB 904, and 5GC 906 (which comprises AMF 908 and UPF 910).

The signal flow of signal flow 900 is an example signal flow, and there can be signal flows that implement different signals, or the signals of signal flow 900 in a different order, as part of facilitating dynamic additional DMRS configuration.

As depicted in signal flow 900, the following occurs:

5G-NR RRC connection setup 912

Msg1:Preamble 914

Allocate temporary C-RNTI 916

PDCCH DCI Format 1_0 [RA_RNTI] 918

Msg2:Random Access Response 920

Msg3:RRCSetupRequest 922

PDCCH DCI Format 1_0 [C_RNTI] 924

Msg4:RRCSetup 926, where a dynamicAdditionalDmrsSupport[TRUE/FALSE] IE is contained in this message, and can be added as part of the present techniques PDCCH DCI Format 0_0 [C_RNTI] 928

RRCSetupComplete 930

AMF Selection 932

Initial UE message [NAS-PDU:Registration Request] 934

NAS Identity Request/Response 936

NAS Authentication Request/Response 938

NAS Security Mode Command/Complete 940

UE capability enquiry 941A

UE capability information, with dynamicAdditionalDmrsSupport[Supported] IE in FeatureSetUplink 941B Initial Context Setup Request [NAS-PDU:Registration Accept] 942

RRCReconfiguration with dynamicAdditionalDmrsSupport=TRUE in PUSCH-Config IE where UE supports this feature in uplink 944

RRCReconfigurationComplete 946

Initial Context Setup Response 948

SA UE attach procedure completed 950

Start uplink data transfer and channel quality reporting 952

Uplink data 954

Uplink data 956

PDCCH DCI Format 0_1 [C_RNTI] 958

Uplink Data [MAC PDU contains PDSCH] 960

CRC status=PASS for UL PUSCH data 962

Uplink data 964

Uplink data 966

CSI Report [SNR>=10] 968

UL data decoding failed at gNB 970

CSI Report [SNR=5, 4, . . . ] 972

Channel condition getting worse 974

CSI Report [SNR=4, 2, 1, 0, −1, . . . ] 976

PDCCH DCI Format 0_1 [C_RNTI] 978

Uplink Data [MAC PDU contains PUSCH] 980

CRC Status=FAIL for UL PUSCH because of low SNR 982

Trigger/change additional DMRS configuration in UL DCI because of a condition 984, where, in some examples, a condition can be UL SNR reporting is bad for a certain threshold and period; UL CRC fails because SNR is low (e.g., BLER is high for a certain threshold and period); UE is on a cell edge; and/or UE is on high mobility Uplink data 986

PDCCH DCI Format 0_1 [with additional DMRS indicator field] 988, where the additional DMRS indicator field can be implemented as part of the present techniques Uplink data [MAC PDU contains PUSCH] 990

CRC Status=PASS for UL PUSCH data 992

Uplink data 994

Improvement seen in CRC Pass for UL Data 996

UL Data transfer continues 998

Figure 8B:
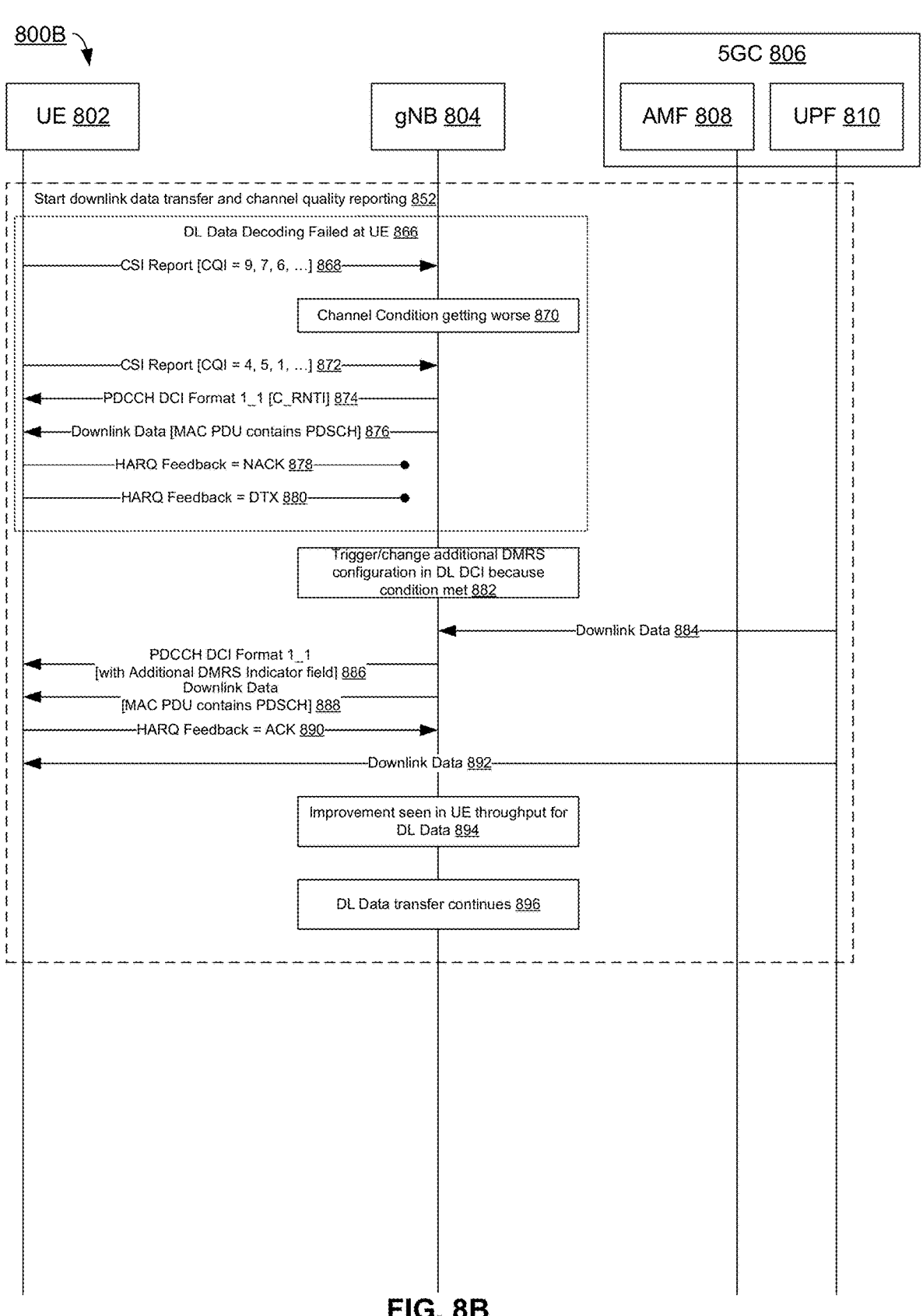

User equipment 902, gNB 904, 5GC 906, AMF 908, and UPF 910 can be similar to user equipment 802, gNB 804, 5GC 806, AMF 808, and UPF 810 of FIGS. 8A and 8B, respectively. Signals 912-950 can be similar to signals 812-850. Additionally, in signals 912-950, an IE dynamicAdditionalDmrsSupport can be available for downlink, and an uplink structure can be different relative to signals 812-850 of FIG. 8A.

Example Process Flows

FIG. 10 illustrates an example process flow 1000 that can facilitate dynamic additional DMRS configuration, in accordance with an embodiment of this disclosure. In some examples, one or more embodiments of process flow 1000 can be implemented by UE 802 of FIGS. 8A and 8B, UE 902 of FIGS. 9A and 9B, and/or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

Process flow 1000 begins with 1002, and moves to operation 1004.

Operation 1004 depicts configuring a first number of demodulation reference signal positions in radio resource control information as part of a connection setup with a base station that is configured to facilitate first broadband cellular communications. This can comprise user equipment (e.g., UE 802 of FIGS. 8A and 8B) establishing a connection setup with a gNB (e.g., gNB 804 of FIGS. 8A and 8B), where the connection setup can be similar to NR RRC connection setup 812 and/or NR RRC connection setup 912. The first number of additional demodulation reference signal positions can be the number that are established as part of an attach procedure.

In some examples, operation 1004 comprises, as part of the attaching to the base station, receiving, from the base station, a radio resource control setup message that indicates that the base station supports modification of the first number of demodulation reference signal positions after attaching to the base station. That is, operation 1004 can comprise Msg4:RRCSetup (with dynamicAdditionalDmrsSupport[TRUE/FALSE] IE (in a downlink case, which can be similar to 826 of FIG. 8A), and/or Msg4:RRCSetup (with dynamicAdditionalDmrsSupport[TRUE/FALSE] IE (in an uplink case, which can be similar to 926 of FIG. 9A).

In some examples, an information element of the radio resource control setup message indicates that the base station supports the modification of the first number of demodulation reference signal positions after attaching to the base station. That is, an IE can be used to indicate the additional DMRS signal position support.

After operation 1004, process flow 1000 moves to operation 1006.

Operation 1006 depicts, after attaching to the base station, receiving a message from the base station indicative of modifying the first number of demodulation reference signal positions to a second number of demodulation reference signal positions. This message can be similar to PDCCH DCI Format 1_1 [with Additional DMRS Indicator field]

886, and/or PDCCH DCI Format 0_1 [with Additional DMRS Indicator field] 988, and received by user equipment.

Figure 9B:
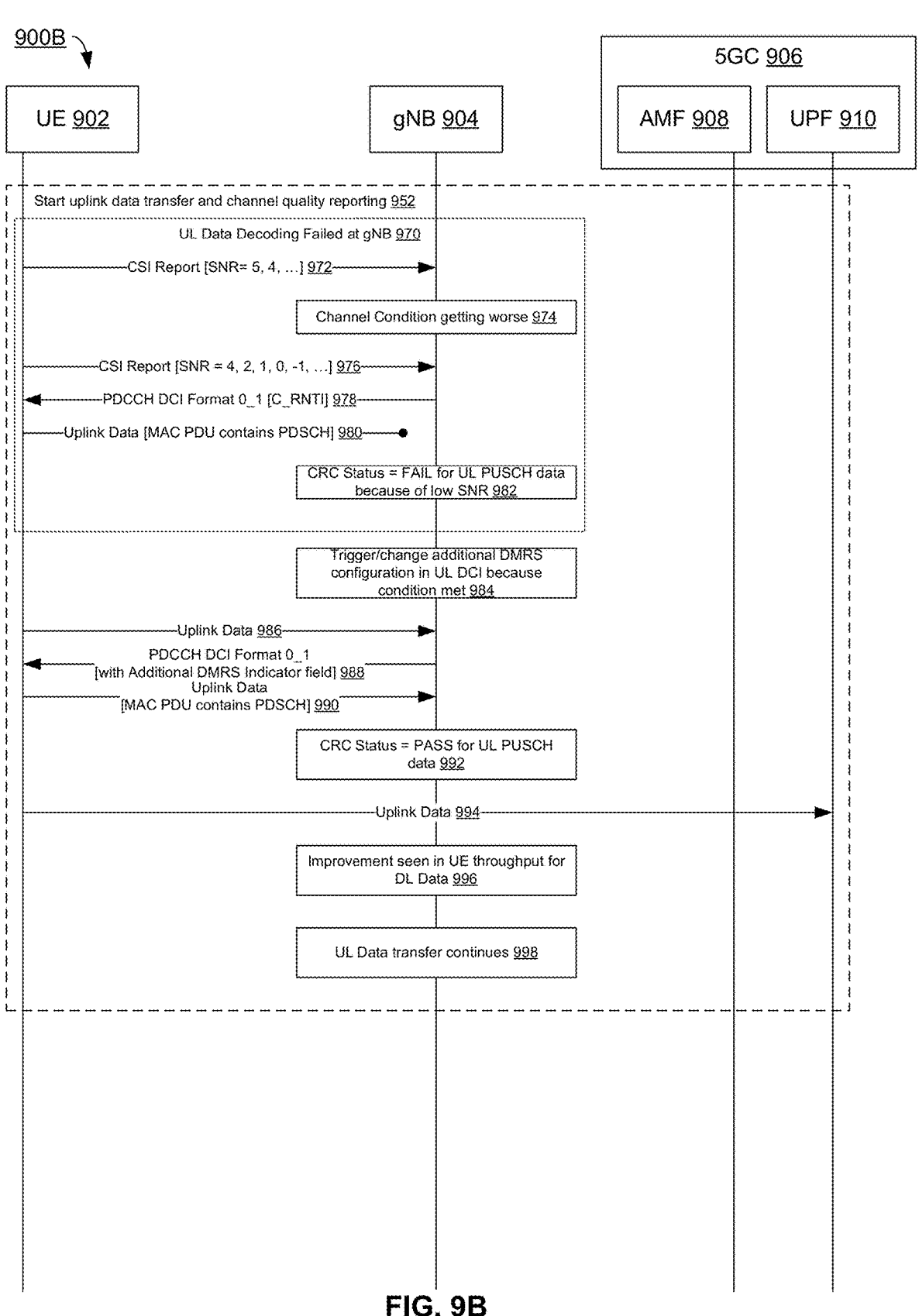

This message can be received in response to trigger/change additional DMRS configuration in DL DCI because condition met 882 of FIG. 8B (in a case of modifying additional DMRS configuration for downlink communications), or trigger/change additional DMRS configuration in UL DCI because of a condition 984 of FIG. 9B (in a case of modifying additional DMRS configuration for uplink communication). Where modifying the additional DMRS positions is performed after UE attach where the number of additional DMRS positions is initially set, this can be a dynamic configuration.

In some examples, operation 1006 comprises, before receiving the message from the base station indicative of modifying the first number of demodulation reference signal positions, sending, to the base station, a user equipment capability message that indicates support for modification of the first number of demodulation reference signal positions after attaching to the base station. In some examples, this comprises user equipment sending a UE capability information (with dynamicAdditionalDmrsSupport[Supported] IE message, such as in 841B or 941B.

In some examples, an information element of the user equipment capability message indicates the support for the modification of the first number of demodulation reference signal positions after attaching to the base station. That is, an IE can be used to indicate the additional DMRS signal position support.

In some examples, operation 1006 comprises, before receiving the message from the base station indicative of modifying the first number of demodulation reference signal positions, receiving a radio resource control reconfiguration message that indicates that the base station supports modification of the first number of demodulation reference signal positions after attaching to the base station. In some examples, this comprises user equipment receiving a RRCReconfiguration with dynamicAdditionalDmrsSupport=TRUE in PDSCH-Config IE message (such as in 844 of FIG. 8A) or a RRCReconfiguration with dynamicAdditionalDmrsSupport=TRUE in PUSCH-Config IE message (such as in 944 of FIG. 9A).

In some examples, a physical downlink shared channel configuration information element of the radio resource control reconfiguration message indicates that the base station supports the modification of the first number of demodulation reference signal positions in downlink communications (such as in 844 of FIG. 8A). In some examples, a physical uplink shared channel configuration information element of the radio resource control reconfiguration message indicates that the base station supports the modification of the first number of demodulation reference signal positions in uplink communications (such as in 944 of FIG. 9A).

After operation 1006, process flow 1000 moves to operation 1008.

In some examples, the message from the base station indicative of modifying the first number of demodulation reference signal positions to the second number of demodulation reference signal positions comprises a downlink control information message in a 1_1 format, and wherein the message indicates that the base station supports modification of the first number of demodulation reference signal positions in downlink communications. That is, the message can be similar to PDCCH DCI Format 1_1 [with Additional DMRS Indicator field], as in 886 of FIG. 8B.

In some examples, the message from the base station indicative of modifying the first number of demodulation reference signal positions to the second number of demodulation reference signal positions comprises a downlink control information message in a 0_1 format, and wherein the message indicates that the base station supports the modification of the first number of demodulation reference signal positions in uplink communications. That is, the message can be similar to PDCCH DCI Format 0_1 [with Additional DMRS Indicator field], as in 988 of FIG. 9B.

Operation 1008 depicts conducting second broadband cellular communications with the base station according to the second number of demodulation reference signal positions, wherein a throughput of the second broadband cellular communications is determined as a function of a size of a transport block set based on the second number of demodulation reference signal positions. This can comprise the user equipment using the dynamically configured additional DMRS positions, such as in DL data transfer continues 896 of FIG. 8B (in a case of downlink communications), and/or UL data transfer continues 998 of FIG. 9B (in a case of uplink communications).

After operation 1008, process flow 1000 moves to 1010, where process flow 1000 ends.

FIG. 11 illustrates an example process flow 1100 that can facilitate dynamic additional DMRS configuration, in accordance with an embodiment of this disclosure. In some examples, one or more embodiments of process flow 1100 can be implemented by UE 802 of FIGS. 8A and 8B, UE 902 of FIGS. 9A and 9B, and/or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts, after attaching to a base station that is configured to facilitate first broadband cellular communications, receiving a message from the base station indicative of modifying a first number of demodulation reference signal positions that was established as part of a connection setup to a second number of demodulation reference signal positions. In some examples, operation 1104 can be implemented in a similar manner as operations 1004-1006 of FIG. 10.

In some examples, the second number of demodulation reference signal positions is configured for uplink communications of the broadband cellular communications, and wherein the receiving the message from the base station is performed in response to sending uplink data to the base station. That is, the additional DMRS positions can be changed for uplink, and can a determination to change the additional DRMS positions can be made based on uplink data. This can be similar to the examples of FIGS. 9A-9B.

In some examples, the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

In some examples, when UL data transmission occurs, and a gNB determines that there are too many CRC failures, or a bad SNR, that can indicate that the corresponding UE is on a cell edge. A similar condition can occur in a case of high mobility. In such an example, where a UE is moving at a fast speed, and does not have a proper signal with the gNB, the CRC can fail at the gNB, and the SNR can be bad.

After operation 1104, process flow 1100 moves to operation 1106.

Operation 1106 depicts conducting broadband cellular communications with the base station according to the second number of demodulation reference signal positions. In some examples, operation 1106 can be implemented in a similar manner as operation 1010 of FIG. 10.

After operation 1106, process flow 1100 moves to 1108, where process flow 1100 ends.

FIG. 12 illustrates an example process flow 1200 that can facilitate dynamic additional DMRS configuration, in accordance with an embodiment of this disclosure. In some examples, one or more embodiments of process flow 1200 can be implemented by UE 802 of FIGS. 8A and 8B, UE 902 of FIGS. 9A and 9B, and/or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11.

Process flow 1200 begins with 1202, and moves to operation 1204.

Operation 1204 depicts, after attaching to a base station that is configured to facilitate first broadband cellular communications, receiving a message from the base station indicative of a modified number of demodulation reference signal positions that was established as part of a connection setup. In some examples, operation 1204 can be implemented in a similar manner as operations 1004-1006 of FIG. 10.

In some examples, modifying the number of demodulation reference signal positions is performed for downlink communications of the broadband cellular communications, and wherein the receiving the message from the base station is performed in response to sending downlink data to the base station. That is, the additional DMRS positions can be changed for downlink, and can a determination to change the additional DRMS positions can be made based on downlink data. This can be similar to the examples of FIGS. 8A-8B.

In some examples, modifying DL additional DMRS positions can be based on feedback received from UE for DL data. For example, if the HARQ feedback is NACK continuously, then that can indicate changing the DL DMRS positions. In another example, if the CQI reporting is bad, that can also indicate changing the DL DMRS positions.

In some examples, the downlink data indicates that a continuous quality improvement reporting metric does not satisfy a threshold associated with a defined threshold criterion for a defined amount of time. That is, CQI reporting can be bad for a certain quality threshold and time period.

In some examples, the downlink data indicates that hybrid automatic feedback is being reported as a negative acknowledgement. That is, HARQ feedback can be reported as NACK.

In some examples, the downlink data indicates that hybrid automatic feedback is being reported as the negative acknowledgement based on a block error rate metric satisfying a threshold associated with a defined threshold criterion for a defined amount of time. That is BLER can be high for a certain quality threshold and time period.

In some examples, the downlink data indicates that there is a connection to edge network equipment of a cellular network via which the first broadband cellular communications are conducted, or that a defined high mobility criterion is satisfied. That is, the UE can be on a cell edge, or be on high mobility.

For example, when DL data transmission occurs, and when a gNB receives too many HARQ feedback failures or low CQI reporting from the UE, that can indicate that the UE is on cell edge, so can lack enough power or signal conditions to send HARQ feedback as ACK.

A similar situation can occur in a case of high mobility. Where a UE is moving at a fast speed, and the UE lacks a proper signal The same can be applicable in the case of high mobility. Where a UE is moving at a very fast speed, and the UE does not have a proper signal, in that case the CRC can fail at the UE for DL data, and CQI reporting will be bad.

After operation 1204, process flow 1200 moves to operation 1206.

Operation 1206 depicts conducting broadband cellular communications with the base station according to the modified number of demodulation reference signal positions. In some examples, operation 1206 can be implemented in a similar manner as operation 1010 of FIG. 10.

In some examples, the broadband cellular communications are second broadband cellular communications, modifying the number of demodulation reference signal positions comprises modifying the number of demodulation reference signal positions from a first number of demodulation reference signal positions to a second number of demodulation reference signal positions, and a second throughput of the second broadband cellular communications is less than a first throughput of a first broadband cellular communication that is conducted according to the first number of demodulation reference signal positions. That is, data throughput (TP) can be inversely proportional to a number of configured additional DRMS positions. That is, where more additional DMRS symbols are configured, then data throughput can be lessened.

After operation 1206, process flow 1200 moves to 1208, where process flow 1200 ends.

Example Operating Environment

Figure 13:
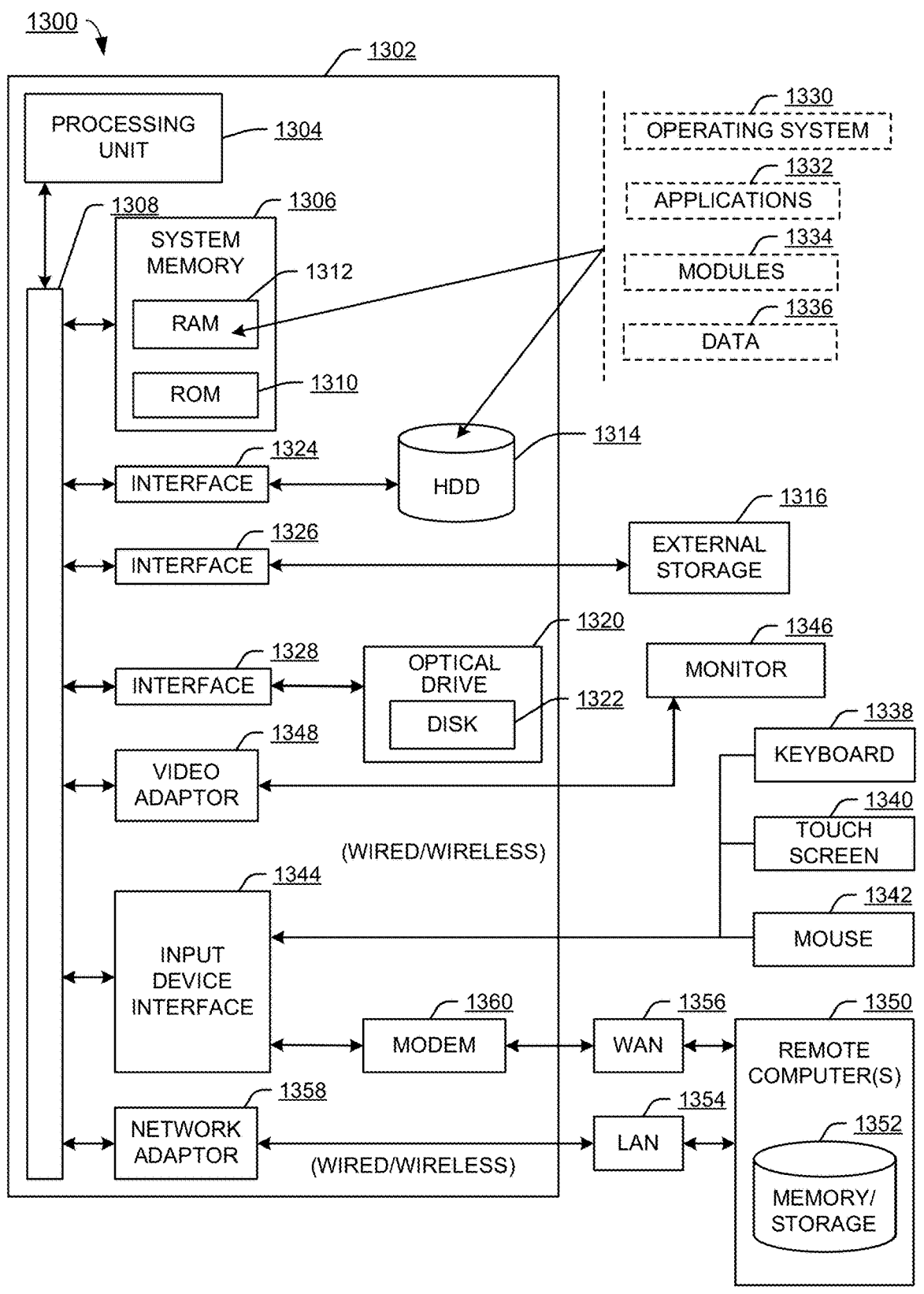
FIG. 13 illustrates an example block diagram of a computer operable to execute an embodiment of this disclosure.

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of dynamic additional DMRS configuration component 310 of FIGS. 3A and 3B; dynamic additional DMRS configuration component 410 of FIGS. 4A and 4B; dynamic additional DMRS configuration component 510 of FIGS. 5A and 5B; dynamic additional DMRS configuration component 610 of FIGS. 6A and 6B; gNB 702 and/or UE 704 of FIG. 7; UE 802, gNB 804, and/or 5GC 806 of FIGS. 8A and 8B; and/or UE 902, gNB 904, and/or 5GC 906 of FIGS. 9A and 9B.

In some examples, computing environment 1300 can implement one or more embodiments of the process flows of FIGS. 10-12 to facilitate dynamic additional DMRS configuration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the at least one processor, comprising instructions that cause the at least one processor to perform operations comprising:
configuring a first number of demodulation reference signal positions in radio resource control information as part of attaching to a base station that is configured to facilitate first broadband cellular communications;
as part of the attaching to the base station, receiving, from the base station, a first message that comprises a first value that indicates that the base station is able to support modification of the first number of demodulation reference signal positions after the attaching to the base station, and wherein the first message is configured to comprise a second value that indicates that the base station is not able to support modification of the first number of demodulation reference signal positions after the attaching to the base station;
after the attaching to the base station, receiving a second message from the base station indicative of modifying the first number of demodulation reference signal positions to a second number of demodulation reference signal positions; and
conducting second broadband cellular communications with the base station according to the second number of demodulation reference signal positions, wherein a throughput of the second broadband cellular communications is determined as a function of a size of a transport block set based on the second number of demodulation reference signal positions.

2. The system of claim 1, wherein the first message comprises a radio resource control setup message.

3. The system of claim 2, wherein an information element of the radio resource control setup message comprises the first value.

4. The system of claim 1, wherein the operations further comprise:
before receiving the second message from the base station indicative of modifying the first number of demodulation reference signal positions, sending, to the base station, a user equipment capability message that comprises a third value that indicates that the system is able to support modification of the first number of demodulation reference signal positions after the attaching to the base station, and wherein the user equipment capability message is configured to comprise a fourth value that indicates that the system is unable to support modification of the first number of demodulation reference signal positions after the attaching to the base station.

5. The system of claim 4, wherein an information element of the user equipment capability message comprises the third value.

6. The system of claim 1, wherein the first message comprises a radio resource control reconfiguration message.

7. The system of claim 6, wherein a physical downlink shared channel configuration information element of the radio resource control reconfiguration message comprises the first value.

8. The system of claim 6, wherein a physical uplink shared channel configuration information element of the radio resource control reconfiguration message comprises the first value.

9. The system of claim 1, wherein the second message from the base station indicative of modifying the first number of demodulation reference signal positions to the second number of demodulation reference signal positions comprises a downlink control information message in a 1_1 format, and wherein the second message comprises a field that indicates that the base station is able to support modification of the first number of demodulation reference signal positions in downlink communications.

10. The system of claim 1, wherein the message from the base station indicative of modifying the first number of demodulation reference signal positions to the second number of demodulation reference signal positions comprises a downlink control information message in a 0_1 format, and wherein the second message comprises a field that indicates that the base station is able to support modification of the first number of demodulation reference signal positions in uplink communications.

11. A method, comprising:

as part of attaching to a base station that is configured to facilitate first broadband cellular communications, receiving, by a system comprising at least one processor and from the base station, a first message that comprises a first value that indicates that the base station supports modification of the first number of demodulation reference signal positions after the attaching to the base station, and wherein the first message is configured to comprise a second value that indicates that the base station lacks support for modification of the first number of demodulation reference signal positions after the attaching to the base station;

after the attaching to the base station, receiving, by the system, a second message from the base station indicative of modification of the first number of demodulation reference signal positions, which was established as part of the attaching, to a second number of demodulation reference signal positions; and conducting, by the system, broadband cellular communications with the base station according to the second number of demodulation reference signal positions.

12. The method of claim 11, wherein the second number of demodulation reference signal positions is configured for uplink communications of the broadband cellular communications, and wherein the receiving the second message from the base station is performed in response to sending uplink data to the base station.

13. The method of claim 12, wherein the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

14. A non-transitory computer-readable medium comprising instructions that, in response to execution, cause a system comprising at least one processor to perform operations, comprising:

as part of attaching to a base station, receiving a first message from the base station that comprises a value that indicates that the base station supports modification of the first number of demodulation reference signal positions after attaching to the base station;

after the attaching to the base station, receiving a second message from the base station indicative of a modified number of demodulation reference signal positions that was established as part of a connection setup; and conducting broadband cellular communications with the base station according to the modified number of demodulation reference signal positions.

15. The non-transitory computer-readable medium of claim 14, wherein modifying the number of demodulation reference signal positions is performed for downlink communications of the broadband cellular communications, and wherein the receiving the second message from the base station is performed in response to sending downlink data to the base station.

16. The non-transitory computer-readable medium of claim 15, wherein the downlink data indicates that a continuous quality improvement reporting metric does not satisfy a threshold associated with a defined threshold criterion for a defined amount of time.

17. The non-transitory computer-readable medium of claim 15, wherein the downlink data indicates that hybrid automatic feedback is being reported as a negative acknowledgement.

18. The non-transitory computer-readable medium of claim 17, wherein the downlink data indicates that hybrid automatic feedback is being reported as the negative acknowledgement based on a block error rate metric satisfying a threshold associated with a defined threshold criterion for a defined amount of time.

19. The non-transitory computer-readable medium of claim 15, wherein the downlink data indicates that there is a connection to edge network equipment of a cellular network that comprises the base station, or that a defined high mobility criterion is satisfied.

20. The non-transitory computer-readable medium of claim 14, wherein the broadband cellular communications are second broadband cellular communications, wherein modifying the number of demodulation reference signal positions comprises modifying the number of demodulation reference signal positions from a first number of demodulation reference signal positions to a second number of demodulation reference signal positions, and wherein a second throughput of the second broadband cellular communications is less than a first throughput of first broadband cellular communications that are conducted according to the first number of demodulation reference signal positions.

* * * * *